US008014446B2

(12) United States Patent
Shah et al.

(10) Patent No.: US 8,014,446 B2
(45) Date of Patent: Sep. 6, 2011

(54) METHOD AND APPARATUS FOR STORE AND REPLAY FUNCTIONS IN A DIGITAL RADIO BROADCASTING RECEIVER

(75) Inventors: Chinmay Shah, Piscataway, NJ (US); Armond Capparelli, Milltown, NJ (US); Joseph F. D'Angelo, Bedminster, NJ (US); Ashwini Pahuja, Albertson, NY (US); Jordan Scott, Cranford, NJ (US); Girish Warrier, Edison, NJ (US)

(73) Assignee: iBiquity Digital Corporation, Columbia, MD (US)

( * ) Notice: Subject to any disclaimer, the term of this patent is extended or adjusted under 35 U.S.C. 154(b) by 1198 days.

(21) Appl. No.: 11/644,083

(22) Filed: Dec. 22, 2006

(65) Prior Publication Data

US 2008/0152039 A1 Jun. 26, 2008

(51) Int. Cl.
*H04N 7/12* (2006.01)

(52) U.S. Cl. ................ 375/240.01; 375/340; 348/389.1; 348/473; 348/555

(58) Field of Classification Search ............. 375/240.01, 375/260, 316, 340; 348/385.1, 388.1, 389.1, 348/473, 553–555, 725, 729
See application file for complete search history.

(56) References Cited

U.S. PATENT DOCUMENTS

| | | | | |
|---|---|---|---|---|
| 5,584,051 | A | 12/1996 | Goken | |
| 5,790,958 | A | 8/1998 | McCoy et al. | |
| 5,815,671 | A | 9/1998 | Morrison | |
| 6,018,612 | A | 1/2000 | Thomason et al. | |
| 6,021,320 | A | 2/2000 | Bickford et al. | |
| 6,078,592 | A | 6/2000 | Spiero | |
| 6,332,175 | B1 | 12/2001 | Birrell et al. | |
| 6,563,805 | B1 | 5/2003 | Ma et al. | |
| 6,564,003 | B2 | 5/2003 | Marko et al. | |
| 6,608,994 | B1 * | 8/2003 | Wegener et al. | 455/3.06 |
| 6,609,097 | B2 | 8/2003 | Costello et al. | |
| 6,622,007 | B2 | 9/2003 | Linden | |
| 6,697,608 | B2 | 2/2004 | King-Smith | |
| 6,785,656 | B2 | 8/2004 | Patsiokas et al. | |
| 6,834,156 | B1 | 12/2004 | Marko et al. | |
| 6,876,835 | B1 | 4/2005 | Marko et al. | |

(Continued)

FOREIGN PATENT DOCUMENTS

EP 1073222 A2 1/2001

OTHER PUBLICATIONS

"Digital Radio Mondiale (DRM); Distribution and Communications Protocol (DCP)", ETSI TS 102 821, ETSI Standards, Lis, Sophia Antipolis, Cedex, France, vol. BC, No. V1.2.1, Oct. 1, 2005, 41 pgs.

*Primary Examiner* — Dac Ha
(74) *Attorney, Agent, or Firm* — Robert P. Lenart, Esq.; Pietragallo Gordon Alfano Bosick & Raspanti, LLP

(57) ABSTRACT

A method is provided for receiving and processing a digital radio broadcasting signal. The method includes the steps of receiving a digital radio broadcasting signal including content, storing encoded content, and decoding the stored encoded content to recover decoded content. The stored encoded content can include protocol data units or packets. The stored encoded content can be recovered by decoding the encoded content according to a logical protocol stack.

53 Claims, 19 Drawing Sheets

U.S. PATENT DOCUMENTS 6,925,489 B1 8/2005 Curtin
6,928,262 B1 8/2005 Kanemitsu
6,965,770 B2 11/2005 Walsh et al.
7,020,217 B1 3/2006 Parsons et al.
7,050,773 B2 * 5/2006 Bi .............................. 455/226.1
7,058,376 B2 6/2006 Logan et al.
7,062,147 B2 6/2006 Cooper et al.
7,117,365 B1 10/2006 Rump et al.
2001/0044664 A1 11/2001 Mueller et al.
2002/0106987 A1 8/2002 Linden
2003/0033325 A1 2/2003 Boogaard
2003/0093476 A1 5/2003 Syed
2004/0063399 A1 4/2004 Milbar
2004/0064208 A1 4/2004 Sinha et al.
2005/0065625 A1 3/2005 Sass
2006/0116161 A1 6/2006 Lee et al.
2006/0156343 A1 7/2006 Jordan
2007/0058931 A1 * 3/2007 Ohnuma et al. ................ 386/83
2007/0082607 A1 * 4/2007 Hong et al. .................. 455/3.06
2007/0153888 A1 * 7/2007 Kim et al. ..................... 375/229
2007/0189712 A1 * 8/2007 Hirayama et al. .............. 386/83
2007/0300262 A1 * 12/2007 Kim ................................ 725/58
2008/0130686 A1 6/2008 Milbar

* cited by examiner

METHOD AND APPARATUS FOR STORE AND REPLAY FUNCTIONS IN A DIGITAL RADIO BROADCASTING RECEIVER

FIELD OF THE INVENTION

This invention relates to digital radio broadcasting, and more particularly to methods and apparatus for storing and replaying received digital radio broadcasting signals.

BACKGROUND OF THE INVENTION

Digital radio broadcasting technology delivers digital audio and data services to mobile, portable, and fixed receivers. One type of digital radio broadcasting, referred to as in-band on-channel (IBOC) digital audio broadcasting (DAB), uses terrestrial transmitters in the existing Medium Frequency (MF) and Very High Frequency (VHF) radio bands. IBOC DAB signals can be transmitted in a hybrid format including an analog modulated carrier in combination with a plurality of digitally modulated carriers or in an all-digital format wherein the analog modulated carrier is not used. Using the hybrid mode, broadcasters may continue to transmit analog AM and FM simultaneously with higher-quality and more robust digital signals, allowing themselves and their listeners to convert from analog to digital radio while maintaining their current frequency allocations.

One feature of digital transmission systems is the inherent ability to simultaneously transmit both digitized audio and data. Thus the technology also allows for wireless data services from AM and FM radio stations. The broadcast signals can include metadata, such as the artist, song title, or station call letters. Special messages about events, traffic, and weather can also be included. For example, traffic information, weather forecasts, news and sports scores, can all be scrolled across a radio receiver's display while the user listens to a radio station.

IBOC DAB technology can provide digital quality audio, superior to existing analog broadcasting formats. Because each IBOC DAB signal is transmitted within the spectral mask of an existing AM or FM channel allocation, it requires no new spectral allocations. IBOC DAB promotes economy of spectrum while enabling broadcasters to supply digital quality audio to the present base of listeners.

Multicasting, the ability to deliver several programs or data streams over one channel in the AM or FM spectrum, enables stations to broadcast multiple streams of data on separate supplemental or sub-channels of the main frequency. For example, multiple streams of data can include alternative music formats, local traffic, weather, news and sports. The supplemental channels can be accessed in the same manner as the traditional station frequency using tuning or seeking functions. For example, if the analog modulated signal is centered at 94.1 MHz, the same broadcast in IBOC DAB can include supplemental channels 94.1-1, 94.1-2, and 94.1-3. Highly specialized programming on supplemental channels can be delivered to tightly targeted audiences, creating more opportunities for advertisers to integrate their brand with program content. As used herein, multicasting includes the transmission of one or more programs in a single digital radio broadcasting channel or on a single digital radio broadcasting signal. Multicast content can include a main program service (MPS), supplemental program services (SPS), program service data (PSD) and/or other broadcast data. The National Radio Systems Committee, a standard setting organization sponsored by the National Association of Broadcasters and the Consumer Electronics Association, adopted an IBOC standard, designated NRSC-5A, in September 2005. NRSC-5A, the disclosure of which is incorporated herein by reference, sets forth the requirements for broadcasting digital audio and ancillary data over AM and FM broadcast channels. The standard and its reference documents contain detailed explanations of the RF/transmission subsystem and the transport and service multiplex subsystem for the system. Copies of the standard can be obtained from the NRSC at http://www.nrscstandards.org/standards.asp. HD Radio™ technology, developed by iBiquity Digital Corporation, is an implementation of the NRSC-5A IBOC standard. Further information regarding HD Radio™ technology can be found at www.hdradio.com and www.ibiquity.com.

Other types of digital radio broadcasting systems include satellite systems such as XM Radio, Sirius and WorldSpace, and terrestrial systems such as Digital Radio Mondiale (DRM), Eureka 147 (branded as DAB), DAB Version 2, and FMeXtra. As used herein, the phrase "digital radio broadcasting" encompasses digital audio broadcasting including in-band on-channel broadcasting, as well as other digital terrestrial broadcasting and satellite broadcasting.

It would be desirable to provide users with methods and apparatus for storing and replaying received digital radio broadcasting signals. Moreover, it would be desirable for a user to: schedule the recording of a particular program or select a program for recording based on genre or other program-related information; record multiple programs at once; and listen to one program while recording one or more different programs. It would also be desirable for a user to be able to navigate through stored program content, during playback, based on program service data or using fast forward and rewind commands. It would further be desirable to provide the user with the capability of managing memory space for stored program content, such as by deleting files individually, collectively based on certain criteria, or using an auto-erase function.

SUMMARY OF THE INVENTION

In a first aspect, the invention provides a method for receiving and processing a digital radio broadcasting signal. The method includes the steps of receiving a digital radio broadcasting signal including content, storing encoded content, and decoding the stored encoded content to recover decoded content.

The content can include protocol data units or packets. The stored encoded content can be recovered by decoding the stored encoded content according to a logical protocol stack.

In another aspect, the invention provides a method for receiving and processing a digital radio broadcasting signal. The method includes the steps of receiving a digital radio broadcasting signal including encoded content in a first format, processing the encoded content to convert the encoded content into a second format, storing the encoded content in a second format, and decoding the stored encoded content to recover decoded content.

In another aspect, the invention provides a receiver for receiving and processing a digital radio broadcasting signal. The receiver includes an input for receiving a digital radio broadcasting signal including content, a memory for storing encoded content, and a processor for decoding the stored encoded content to recover decoded content.

The content can include protocol data units or packets. The processor can process the stored encoded content according to a logical protocol stack.

In another aspect, the invention provides a system for receiving and processing a digital radio broadcasting signal.

The system includes a receiver for receiving a digital radio broadcasting signal including content, the receiver comprising a memory for storing encoded content, and a player for playing encoded content, the player comprising a memory for the storing encoded content and a processor for decoding the stored encoded content to recover decoded content.

In another aspect, the invention provides a method for receiving and processing a digital radio broadcasting signal, including the steps of receiving two or more multicast contents on a single digital radio broadcasting channel, playing a first one of the multicast contents, and concurrently storing a second one of the multicast contents. The multicast contents can be received on a single digital radio broadcasting signal.

In yet another aspect, the invention provides a receiver for receiving and processing a digital radio broadcasting signal, the receiver including an input for receiving two or more multicast contents on a single digital radio broadcasting channel, a processor for playing a first one of the multicast contents, and a memory for concurrently storing a second one of the multicast contents.

In still another aspect, the invention provides a method for receiving and processing a digital radio broadcasting signal, the method including the steps of receiving two or more multicast contents on a single digital radio broadcasting channel, and concurrently storing two or more of the multicast contents.

In another aspect, the invention provides a receiver for receiving and processing a digital radio broadcasting signal, the receiver including an input for receiving two or more multicast contents on a single digital radio broadcasting channel, a memory, and a processor for concurrently storing two or more of the multicast contents in the memory.

In still another aspect, the invention provides a method for receiving and processing a digital radio broadcasting signal, the method including the steps of receiving content on a digital radio broadcasting channel, storing the content, stopping the storing step when the quality of the digital radio broadcasting signal falls below a threshold quality criteria, and resuming the storing step when the quality of the digital radio broadcasting signal exceeds the threshold quality criteria.

In another aspect, the invention provides a receiver for receiving and processing a digital radio broadcasting signal, the receiver including an input for receiving content on a digital radio broadcasting channel, a memory for storing the content, and a processor for storing the content, stopping the storing when the quality of the digital radio broadcasting signal falls below a threshold quality criteria and resuming the storing when the quality of the digital radio broadcasting signal exceeds the threshold quality criteria. In still another aspect, the invention provides a method for receiving and processing a digital radio broadcasting signal, the method including the steps of playing previously stored content, concurrently scanning a plurality of digital radio broadcasting channels to detect a preselected content type, and upon detection of new content of the preselected type, storing the new content.

In another aspect, the invention provides a receiver for receiving and processing a digital radio broadcasting signal, the receiver including a memory for storing content, and a processor for playing previously stored content and, in conjunction with a tuner, for concurrently scanning a plurality of digital radio broadcasting channels to detect a preselected content type and, upon detection of new content of the preselected type, storing the new content.

In still another aspect, the invention provides a method for receiving and processing a digital radio broadcasting signal, the method including the steps of receiving content on a digital radio broadcasting channel, continuously storing segments of the content, and erasing previous segments when new segments are stored.

In another aspect, the invention provides a receiver for receiving and processing a digital radio broadcasting signal, the receiver including an input for receiving content on a digital radio broadcasting channel, a memory for storing content, and a processor for continuously storing segments of the content and erasing previous segments when new segments are stored.

DETAILED DESCRIPTION OF THE INVENTION

Figure 1:
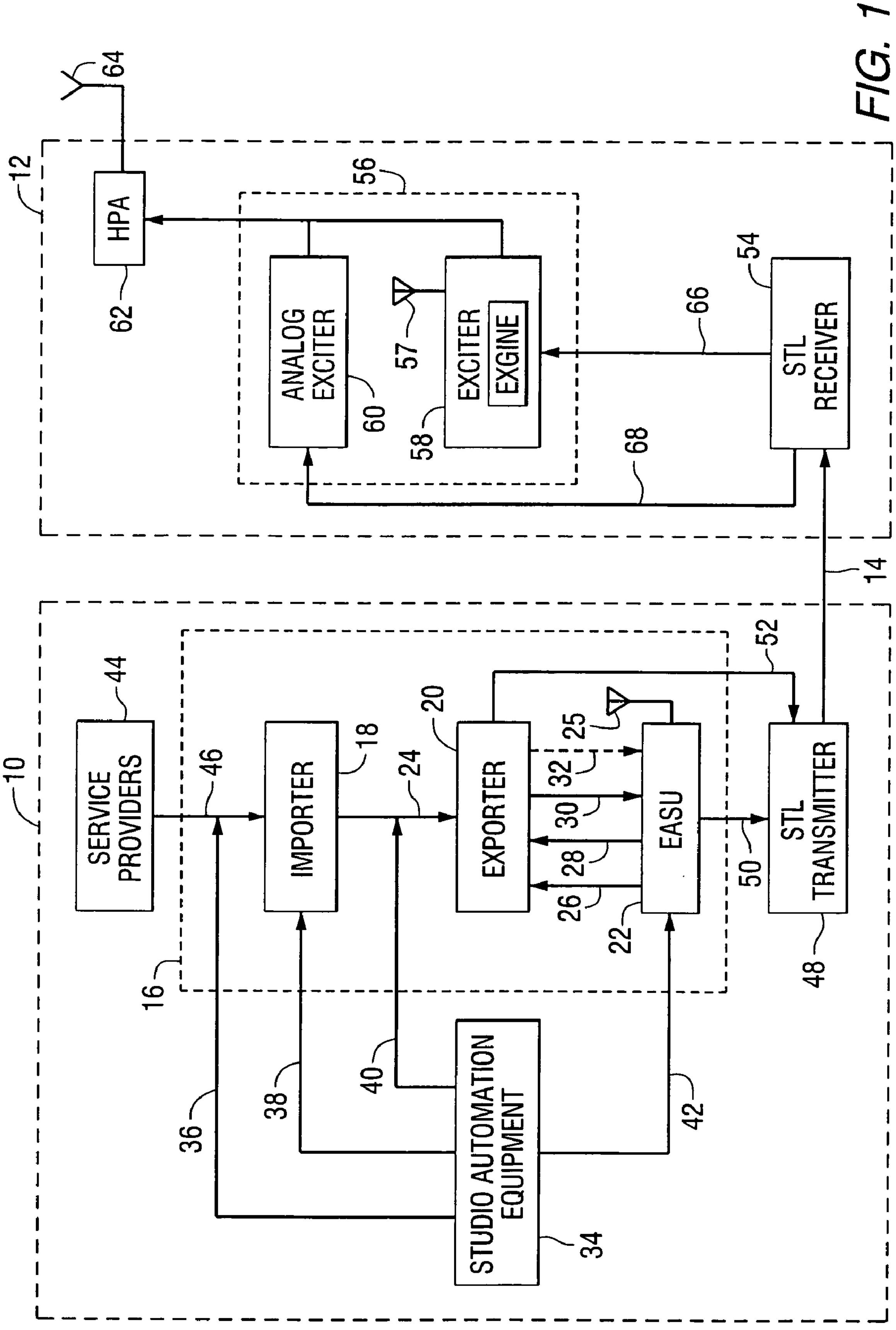
FIG. 1 is a block diagram of a transmitter for use in an in-band on-channel digital radio broadcasting system.

Referring to the drawings, FIG. 1 is a functional block diagram of the relevant components of a studio site 10, an FM transmitter site 12, and a studio transmitter link (STL) 14 that can be used to broadcast an FM IBOC DAB signal. The studio site includes, among other things, studio automation equipment 34, an Ensemble Operations Center (EOC) 16 that includes an importer 18, an exporter 20, an exciter auxiliary service unit (EASU) 22, and a STL transmitter 48. The transmitter site includes an STL receiver 54, a digital exciter 56 that includes an exciter engine (exgine) subsystem 58, and an analog exciter 60. While in FIG. 1 the exporter is resident at a radio station's studio site and the exciter is located at the transmission site, these elements may be co-located at the transmission site.

At the studio site, the studio automation equipment supplies main program service (MPS) audio 42 to the EASU, MPS data 40 to the exporter, supplemental program service (SPS) audio 38 to the importer, and SPS data 36 to the importer. MPS audio serves as the main audio programming source. In hybrid modes, it preserves the existing analog radio programming formats in both the analog and digital transmissions. MPS data, also known as program service data (PSD), includes information such as music title, artist, album name, etc. Supplemental program service can include supplementary audio content as well as program associated data.

The importer contains hardware and software for supplying advanced application services (AAS). A "service" is content that is delivered to users via an IBOC DAB broadcast, and AAS can include any type of data that is not classified as MPS or SPS. Examples of AAS data include real-time traffic and weather information, navigation map updates or other images, electronic program guides, multicast programming, multimedia programming, other audio services, and other content. The content for AAS can be supplied by service providers 44, which provide service data 46 to the importer via an application program interface (API). The service providers may be a broadcaster located at the studio site or externally sourced third-party providers of services and content. The importer can establish session connections between multiple service providers. The importer encodes and multiplexes service data 46, SPS audio 38, and SPS data 36 to produce exporter link data 24, which is output to the exporter via a data link.

The exporter 20 contains the hardware and software necessary to supply the main program service and station information service (SIS) for broadcasting. SIS provides station information, such as call sign, absolute time, position correlated to GPS, etc. The exporter accepts digital MPS audio 26 over an audio interface and compresses the audio. The exporter also multiplexes MPS data 40, exporter link data 24, and the compressed digital MPS audio to produce exciter link data 52. In addition, the exporter accepts analog MPS audio 28 over its audio interface and applies a pre-programmed delay to it to produce a delayed analog MPS audio signal 30. This analog audio can be broadcast as a backup channel for hybrid IBOC DAB broadcasts. The delay compensates for the system delay of the digital MPS audio, allowing receivers to blend between the digital and analog program without a shift in time. In an AM transmission system, the delayed MPS audio signal 30 is converted by the exporter to a mono signal and sent directly to the STL as part of the exciter link data 52.

The EASU 22 accepts MPS audio 42 from the studio automation equipment, rate converts it to the proper system clock, and outputs two copies of the signal, one digital (26) and one analog (28). The EASU includes a GPS receiver that is connected to an antenna 25. The GPS receiver allows the EASU to derive a master clock signal, which is synchronized to the exciter's clock by use of GPS units. The EASU provides the master system clock used by the exporter. The EASU is also used to bypass (or redirect) the analog MPS audio from being passed through the exporter in the event the exporter has a catastrophic fault and is no longer operational. The bypassed audio 32 can be fed directly into the STL transmitter, eliminating a dead-air event.

STL transmitter 48 receives delayed analog MPS audio 50 and exciter link data 52. It outputs exciter link data and delayed analog MPS audio over STL link 14, which may be either unidirectional or bidirectional. The STL link may be a digital microwave or Ethernet link, for example, and may use the standard User Datagram Protocol or the standard TCP/IP.

The transmitter site includes an STL receiver 54, an exciter 56 and an analog exciter 60. The STL receiver 54 receives exciter link data, including audio and data signals as well as command and control messages, over the STL link 14. The exciter link data is passed to the exciter 56, which produces the IBOC DAB waveform. The exciter includes a host processor, digital up-converter, RF up-converter, and exgine subsystem 58. The exgine accepts exciter link data and modulates the digital portion of the IBOC DAB waveform. The digital up-converter of exciter 56 converts from digital-to-analog the baseband portion of the exgine output. The digital-to-analog conversion is based on a GPS clock, common to that of the exporter's GPS-based clock derived from the EASU. Thus, the exciter 56 includes a GPS unit and antenna 57. An alternative method for synchronizing the exporter and exciter clocks can be found in U.S. patent application Ser. No. 11/081,267 (Publication No. 2006/0209941 A1), the disclosure of which is hereby incorporated by reference. The RF up-converter of the exciter up-converts the analog signal to the proper in-band channel frequency. The up-converted signal is then passed to the high power amplifier 62 and antenna 64 for broadcast. In an AM transmission system, the exgine subsystem coherently adds the backup analog MPS audio to the digital waveform in the hybrid mode; thus, the AM transmission system does not include the analog exciter 60. In addition, the exciter 56 produces phase and magnitude information and the analog signal is output directly to the high power amplifier.

IBOC DAB signals can be transmitted in both AM and FM radio bands, using a variety of waveforms. The waveforms include an FM hybrid IBOC DAB waveform, an FM all-digital IBOC DAB waveform, an AM hybrid IBOC DAB waveform, and an AM all-digital IBOC DAB waveform.

Figure 2:
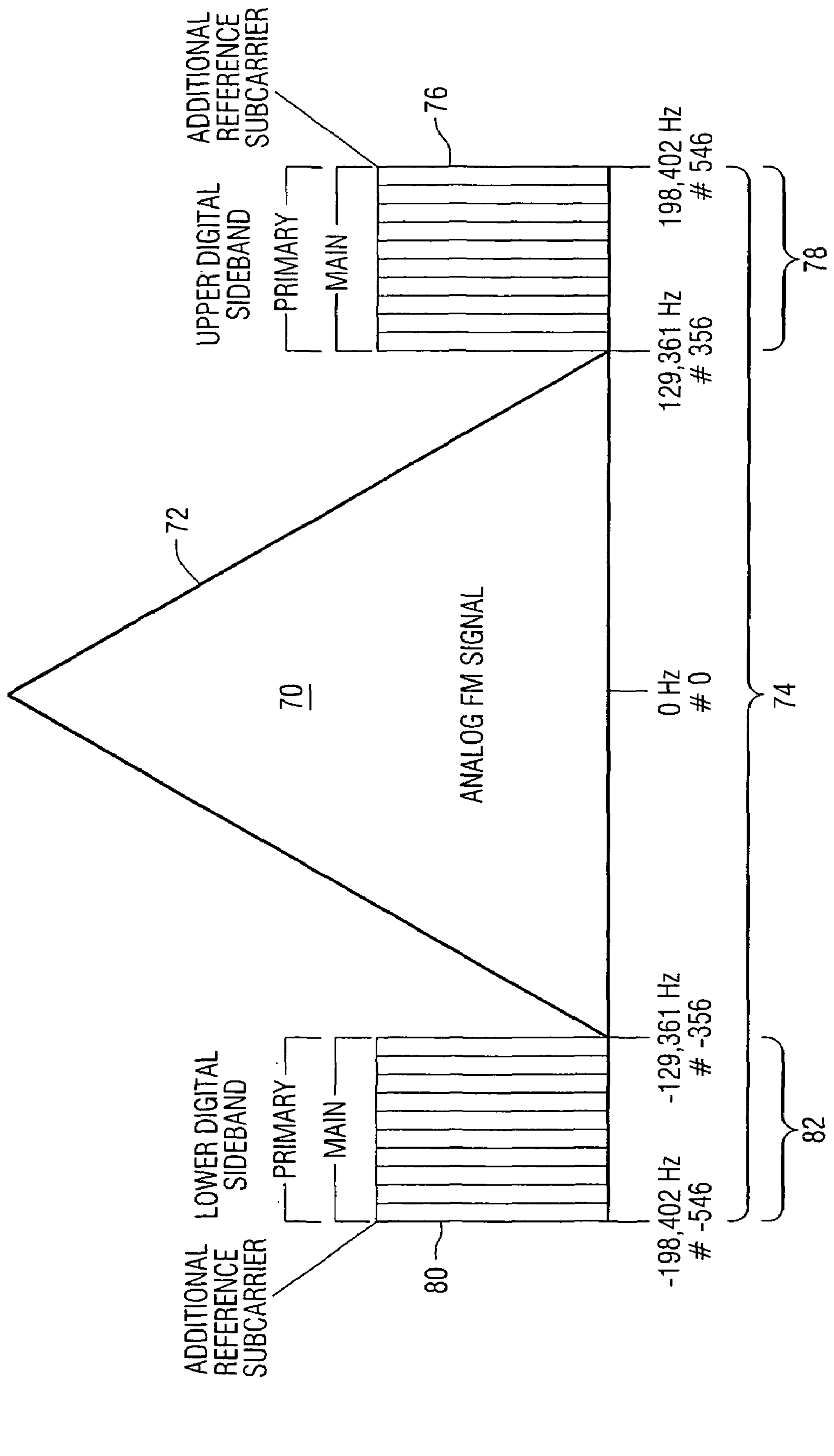
FIG. 2 is a schematic representation of a hybrid FM IBOC waveform.

FIG. 2 is a schematic representation of a hybrid FM IBOC waveform 70. The waveform includes an analog modulated signal 72 located in the center of a broadcast channel 74, a first plurality of evenly spaced orthogonally frequency division multiplexed subcarriers 76 in an upper sideband 78, and a second plurality of evenly spaced orthogonally frequency division multiplexed subcarriers 80 in a lower sideband 82. The digitally modulated subcarriers are divided into partitions and various subcarriers are designated as reference subcarriers. A frequency partition is a group of 19 OFDM subcarriers containing 18 data subcarriers and one reference subcarrier.

The hybrid waveform includes an analog FM-modulated signal, plus digitally modulated primary main subcarriers. The subcarriers are located at evenly spaced frequency locations. The subcarrier locations are numbered from −546 to +546. In the waveform of FIG. 2, the subcarriers are at locations +356 to +546 and −356 to −546. Each primary main sideband is comprised of ten frequency partitions. Subcarriers 546 and −546, also included in the primary main sidebands, are additional reference subcarriers. The amplitude of each subcarrier can be scaled by an amplitude scale factor.

Figure 3:
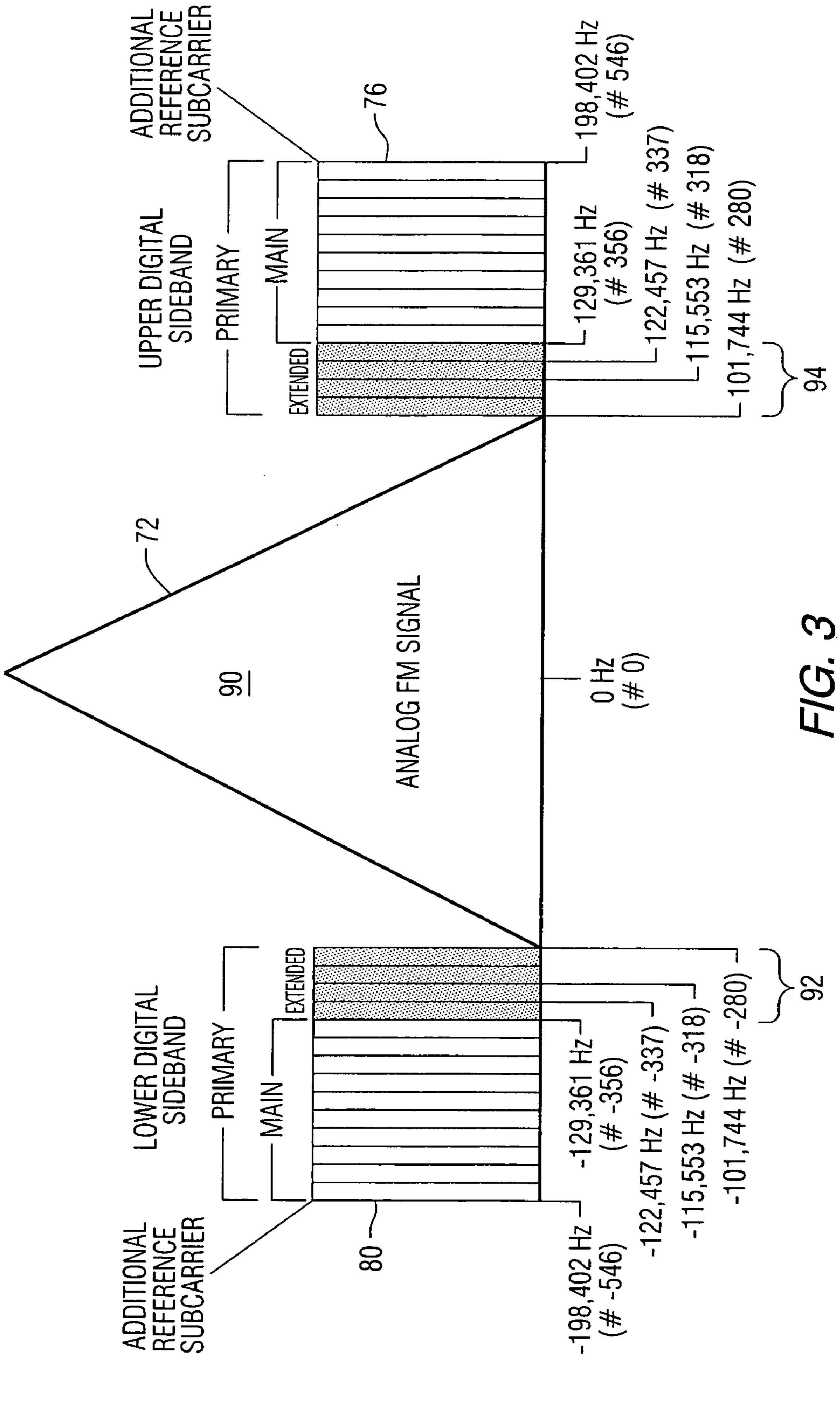
FIG. 3 is a schematic representation of an extended hybrid FM IBOC waveform.

FIG. 3 is a schematic representation of an extended hybrid FM IBOC waveform 90. The extended hybrid waveform is created by adding primary extended sidebands 92, 94 to the primary main sidebands present in the hybrid waveform. One, two, or four frequency partitions can be added to the inner edge of each primary main sideband. The extended hybrid waveform includes the analog FM signal plus digitally modulated primary main subcarriers (subcarriers +356 to +546 and −356 to −546) and some or all primary extended subcarriers (subcarriers +280 to +355 and −280 to −355).

The upper primary extended sidebands include subcarriers 337 through 355 (one frequency partition), 318 through 355 (two frequency partitions), or 280 through 355 (four frequency partitions). The lower primary extended sidebands include subcarriers −337 through −355 (one frequency partition), −318 through −355 (two frequency partitions), or −280 through −355 (four frequency partitions). The amplitude of each subcarrier can be scaled by an amplitude scale factor.

Figure 4:
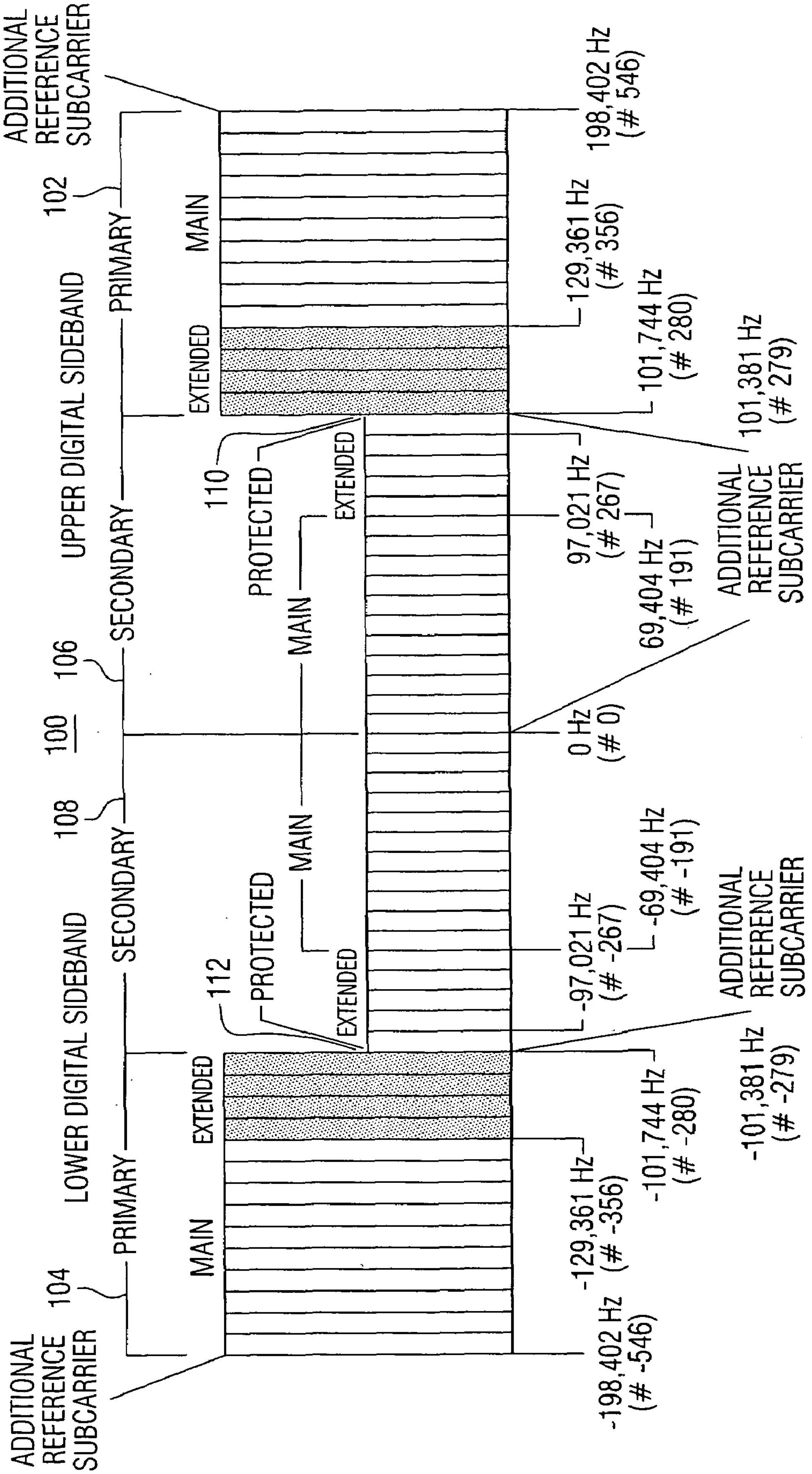
FIG. 4 is a schematic representation of an all-digital FM IBOC waveform.

FIG. 4 is a schematic representation of an all-digital FM IBOC waveform 100. The all-digital waveform is constructed by disabling the analog signal, fully expanding the bandwidth of the primary digital sidebands 102, 104, and adding lower-power secondary sidebands 106, 108 in the spectrum vacated by the analog signal. The all-digital waveform in the illustrated embodiment includes digitally modulated subcarriers at subcarrier locations −546 to +546, without an analog FM signal.

In addition to the ten main frequency partitions, all four extended frequency partitions are present in each primary sideband of the all-digital waveform. Each secondary sideband also has ten secondary main (SM) and four secondary extended (SX) frequency partitions. Unlike the primary sidebands, however, the secondary main frequency partitions are mapped nearer to the channel center with the extended frequency partitions farther from the center.

Each secondary sideband also supports a small secondary protected (SP) region 110, 112 including 12 OFDM subcarriers and reference subcarriers 279 and −279. The sidebands are referred to as "protected" because they are located in the area of spectrum least likely to be affected by analog or digital interference. An additional reference subcarrier is placed at the center of the channel (0). Frequency partition ordering of the SP region does not apply since the SP region does not contain frequency partitions.

Each secondary main sideband spans subcarriers 1 through 190 or −1 through −190. The upper secondary extended sideband includes subcarriers 191 through 266, and the upper secondary protected sideband includes subcarriers 267 through 278, plus additional reference subcarrier 279. The lower secondary extended sideband includes subcarriers −191 through −266, and the lower secondary protected sideband includes subcarriers −267 through −278, plus additional reference subcarrier −279. The total frequency span of the entire all-digital spectrum is 396,803 Hz. The amplitude of each subcarrier can be scaled by an amplitude scale factor. The secondary sideband amplitude scale factors can be user selectable. Any one of the four may be selected for application to the secondary sidebands.

In each of the waveforms, the digital signal is modulated using orthogonal frequency division multiplexing (OFDM). OFDM is a parallel modulation scheme in which the data stream modulates a large number of orthogonal subcarriers, which are transmitted simultaneously. OFDM is inherently flexible, readily allowing the mapping of logical channels to different groups of subcarriers.

In the hybrid waveform, the digital signal is transmitted in primary main (PM) sidebands on either side of the analog FM signal in the hybrid waveform. The power level of each sideband is appreciably below the total power in the analog FM signal. The analog signal may be monophonic or stereo, and may include subsidiary communications authorization (SCA) channels.

In the extended hybrid waveform, the bandwidth of the hybrid sidebands can be extended toward the analog FM signal to increase digital capacity. This additional spectrum, allocated to the inner edge of each primary main sideband, is termed the primary extended (PX) sideband.

In the all-digital waveform, the analog signal is removed and the bandwidth of the primary digital sidebands is fully extended as in the extended hybrid waveform. In addition, this waveform allows lower-power digital secondary sidebands to be transmitted in the spectrum vacated by the analog FM signal.

Figure 5:
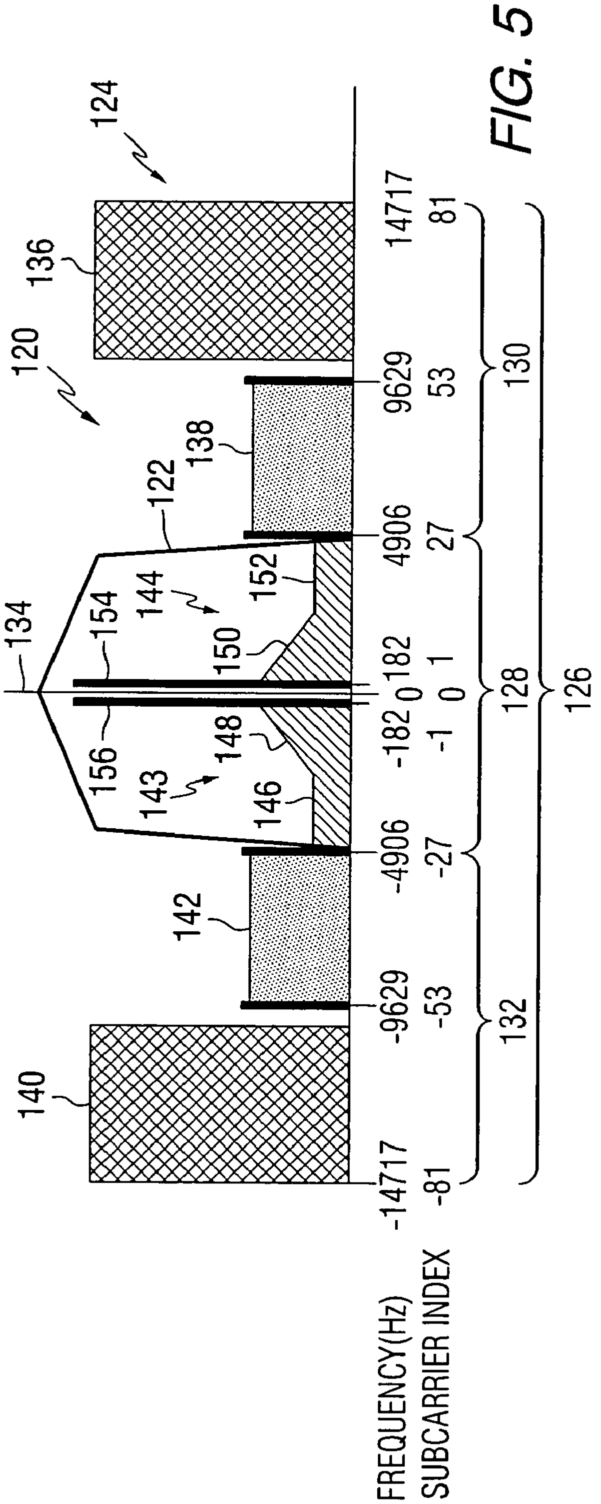
FIG. 5 is a schematic representation of a hybrid AM IBOC DAB waveform.

FIG. 5 is a schematic representation of an AM hybrid IBOC DAB waveform 120. The hybrid format includes the conventional AM analog signal 122 (bandlimited to about ±5 kHz) along with a nearly 30 kHz wide DAB signal 124. The spectrum is contained within a channel 126 having a bandwidth of about 30 kHz. The channel is divided into upper 130 and lower 132 frequency bands. The upper band extends from the center frequency of the channel to about +15 kHz from the center frequency. The lower band extends from the center frequency to about −15 kHz from the center frequency.

The AM hybrid IBOC DAB signal format in one example comprises the analog modulated carrier signal 134 plus OFDM subcarrier locations spanning the upper and lower bands. Coded digital information representative of the audio or data signals to be transmitted (program material), is transmitted on the subcarriers. The symbol rate is less than the subcarrier spacing due to a guard time between symbols.

As shown in FIG. 5, the upper band is divided into a primary section 136, a secondary section 138, and a tertiary section 144. The lower band is divided into a primary section 140, a secondary section 142, and a tertiary section 143. For the purpose of this explanation, the tertiary sections 143 and 144 can be considered to include a plurality of groups of subcarriers labeled 146, 148, 150 and 152 in FIG. 5. Subcarriers within the tertiary sections that are positioned near the center of the channel are referred to as inner subcarriers, and subcarriers within the tertiary sections that are positioned farther from the center of the channel are referred to as outer subcarriers. In this example, the power level of the inner subcarriers in groups 148 and 150 is shown to decrease linearly with frequency spacing from the center frequency. The remaining groups of subcarriers 146 and 152 in the tertiary sections have substantially constant power levels. FIG. 5 also shows two reference subcarriers 154 and 156 for system control, whose levels are fixed at a value that is different from the other sidebands.

The power of subcarriers in the digital sidebands is significantly below the total power in the analog AM signal. The level of each OFDM subcarrier within a given primary or secondary section is fixed at a constant value. Primary or secondary sections may be scaled relative to each other. In addition, status and control information is transmitted on reference subcarriers located on either side of the main carrier. A separate logical channel, such as an IBOC Data Service (IDS) channel can be transmitted in individual subcarriers just above and below the frequency edges of the upper and lower secondary sidebands. The power level of each primary OFDM subcarrier is fixed relative to the unmodulated main analog carrier. However, the power level of the secondary subcarriers, logical channel subcarriers, and tertiary subcarriers is adjustable.

Using the modulation format of FIG. 5, the analog modulated carrier and the digitally modulated subcarriers are transmitted within the channel mask specified for standard AM broadcasting in the United States. The hybrid system uses the analog AM signal for tuning and backup.

Figure 6:
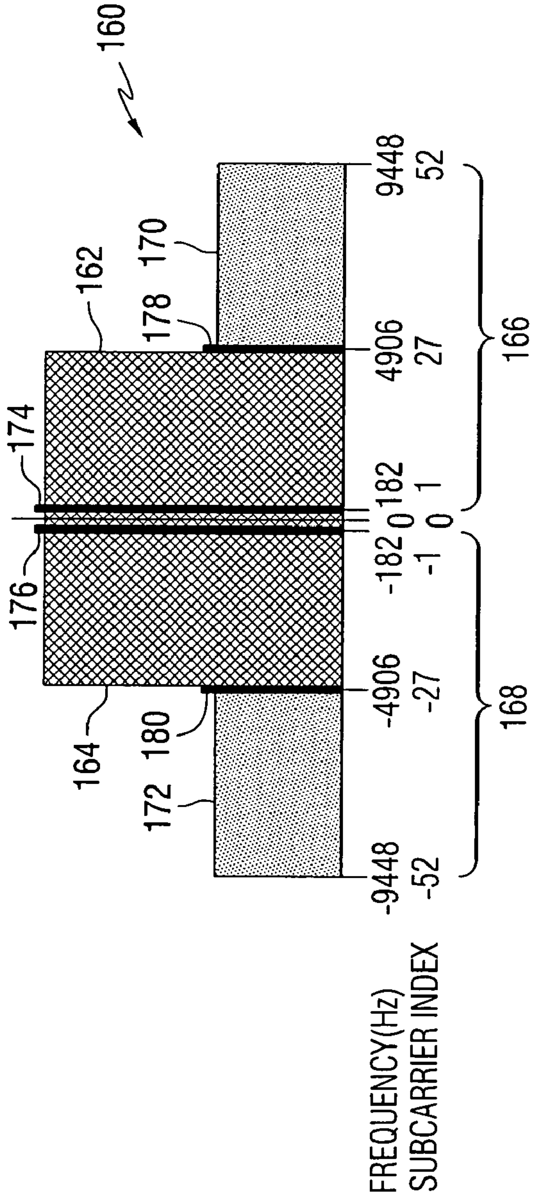
FIG. 6 is a schematic representation of an all-digital AM IBOC DAB waveform.

FIG. 6 is a schematic representation of the subcarrier assignments for an all-digital AM IBOC DAB waveform. The all-digital AM IBOC DAB signal 160 includes first and second groups 162 and 164 of evenly spaced subcarriers, referred to as the primary subcarriers, that are positioned in upper and lower bands 166 and 168. Third and fourth groups 170 and 172 of subcarriers, referred to as secondary and tertiary subcarriers respectively, are also positioned in upper and lower bands 166 and 168. Two reference subcarriers 174 and 176 of the third group lie closest to the center of the channel. Subcarriers 178 and 180 can be used to transmit program information data.

Figure 7:
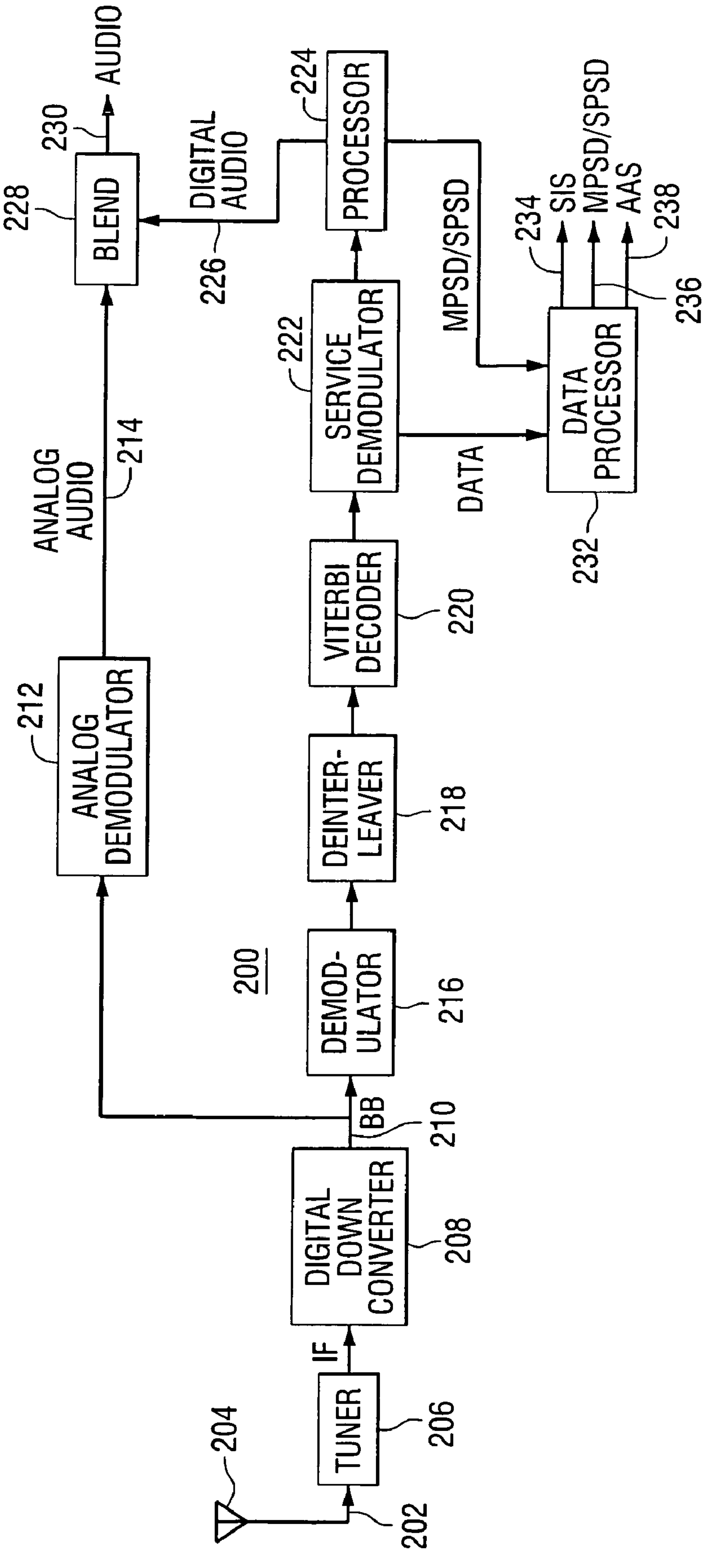
FIG. 7 is a functional block diagram of an AM IBOC DAB receiver.

FIG. 7 is a simplified functional block diagram of an AM IBOC DAB receiver 200. The receiver includes an input 202 connected to an antenna 204, a tuner or front end 206, and a digital down converter 208 for producing a baseband signal on line 210. An analog demodulator 212 demodulates the analog modulated portion of the baseband signal to produce an analog audio signal on line 214. A digital demodulator 216 demodulates the digitally modulated portion of the baseband signal. Then the digital signal is deinterleaved by a deinterleaver 218, and decoded by a Viterbi decoder 220. A service demodulator 222 separates main and supplemental program signals from data signals. A processor 224 processes the program signals to produce a digital audio signal on line 226. The analog and main digital audio signals are blended as shown in block 228, or a supplemental digital audio signal is passed through, to produce an audio output on line 230. A data processor 232 processes the data signals and produces data output signals on lines 234, 236 and 238. The data signals can include, for example, a station information service (SIS), main program service data (MPSD), supplemental program service data (SPSD), and one or more auxiliary application services (AAS).

Figure 8:
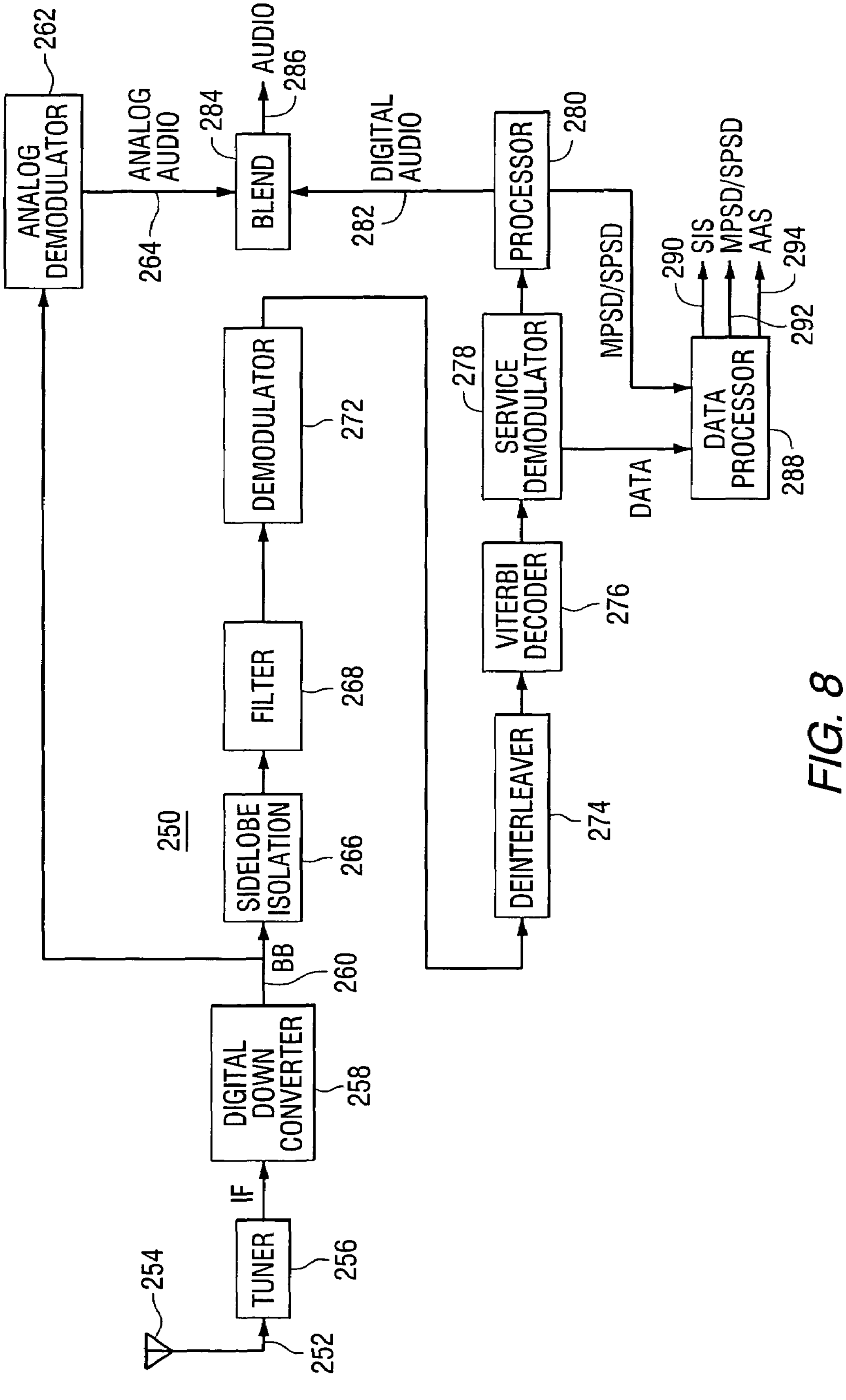
FIG. 8 is a functional block diagram of an FM IBOC DAB receiver.

FIG. 8 is a simplified functional block diagram of an FM IBOC DAB receiver 250. The receiver includes an input 252 connected to an antenna 254, a tuner or front end 256, and a digital down converter 258 for producing a baseband signal on line 260. An analog demodulator 262 demodulates the analog modulated portion of the baseband signal to produce an analog audio signal on line 264. The sideband signals are isolated as shown in block 266, filtered (block 268), and demodulated (block 272) to demodulate the digitally modulated portion of the baseband signal. Then the digital signal is deinterleaved by a deinterleaver 274, and decoded by a Viterbi decoder 276. A service demodulator 278 separates main and supplemental program signals from data signals. A processor 280 processes the main and supplemental program signals to produce a digital audio signal on line 282. The analog and main digital audio signals are blended as shown in block 284, or the supplemental program signal is passed through, to produce an audio output on line 286. A data processor 288 processes the data signals and produces data output signals on lines 290, 292 and 294. The data signals can include, for example, a station information service (SIS), main program service data (MPSD), supplemental program service data (SPSD), and one or more auxiliary application services (AAS).

In practice, many of the signal processing functions shown in the receivers of FIGS. 7 and 8 can be implemented using one or more integrated circuits.

Figure 9A:
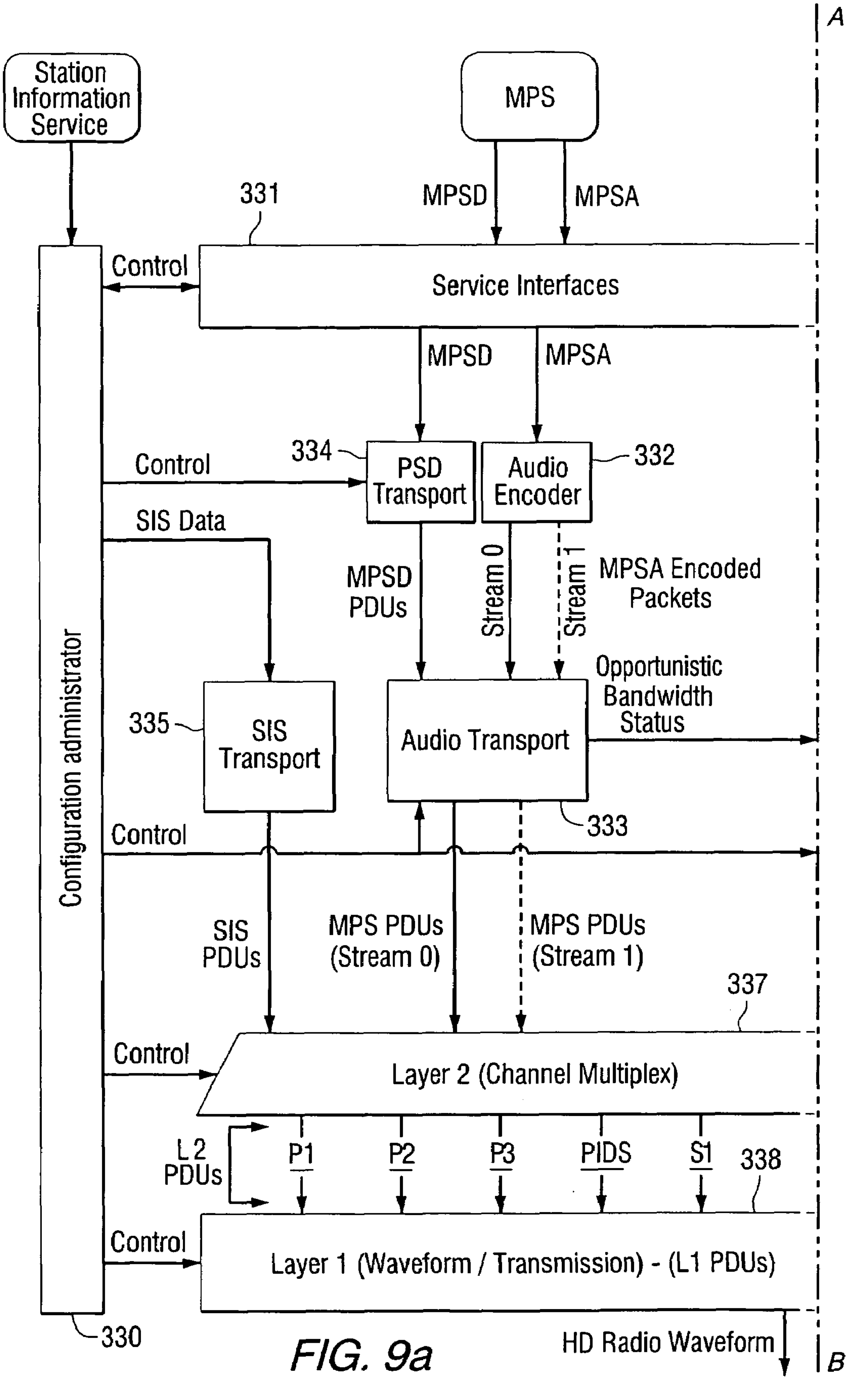
FIGS. 9*a* and 9*b* are diagrams of an IBOC DAB logical protocol stack from the broadcast perspective.
Figure 9B:
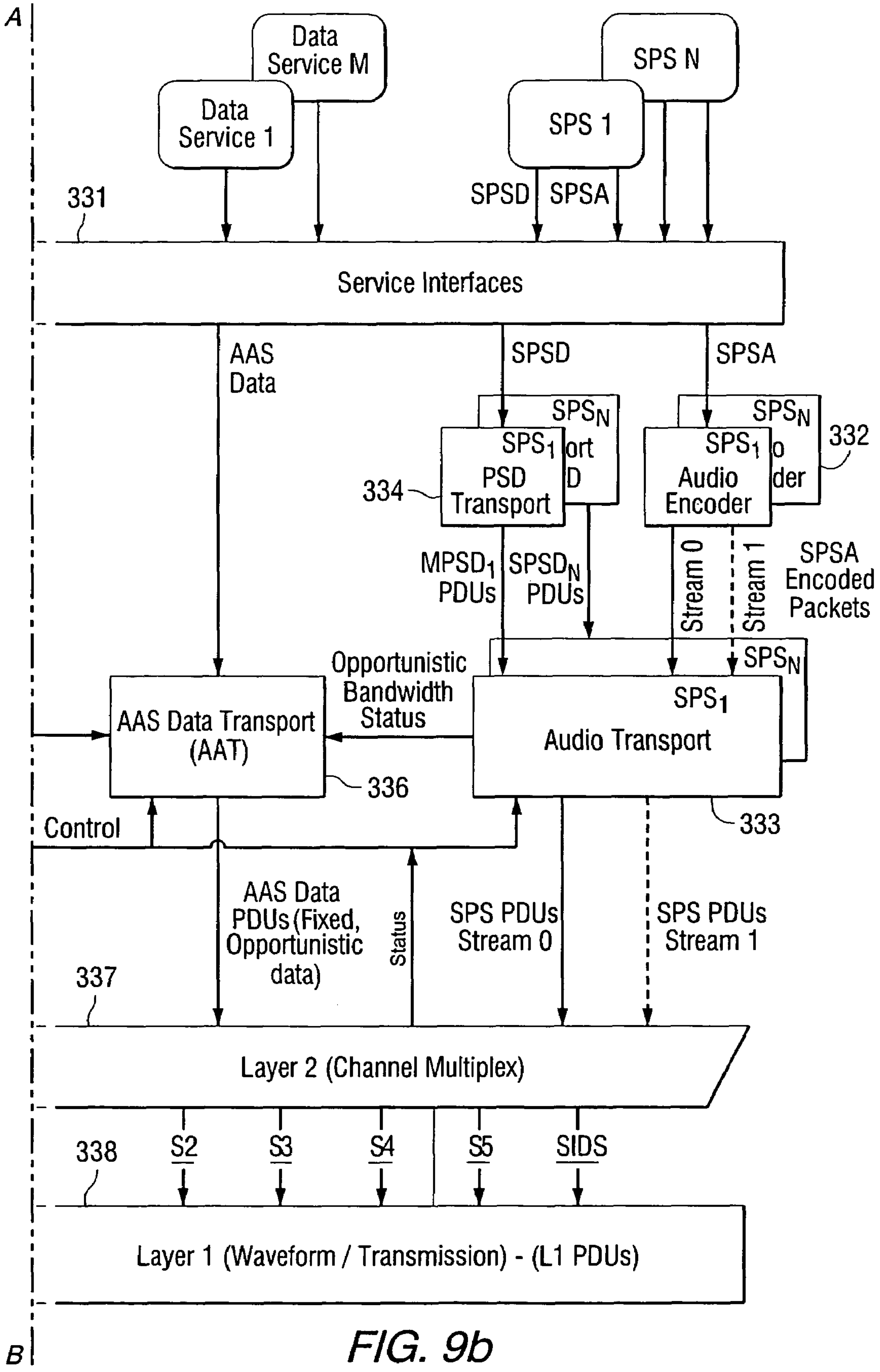

FIGS. 9*a* and 9*b* are diagrams of an IBOC DAB logical protocol stack from the transmitter perspective. From the receiver perspective, the logical stack will be traversed in the opposite direction. Most of the data being passed between the various entities within the protocol stack are in the form of protocol data units (PDUs). A PDU is a structured data block that is produced by a specific layer (or process within a layer) of the protocol stack. The PDUs of a given layer may encapsulate PDUs from the next higher layer of the stack and/or include content data and protocol control information originating in the layer (or process) itself. The PDUs generated by each layer (or process) in the transmitter protocol stack are inputs to a corresponding layer (or process) in the receiver protocol stack.

As shown in FIGS. 9*a* and 9*b*, there is a configuration administrator 330, which is a system function that supplies configuration and control information to the various entities within the protocol stack. The configuration/control information can include user defined settings, as well as information generated from within the system such as GPS time and position. The service interfaces 331 represent the interfaces for all services except SIS. The service interface may be different for each of the various types of services. For example, for MPS audio and SPS audio, the service interface may be an audio card. For MPS data and SPS data the interfaces may be in the form of different application program interfaces (APIs). For all other data services the interface is in the form of a single API. An audio codec 332 encodes both MPS audio and SPS audio to produce core (Stream 0) and optional enhancement (Stream 1) streams of MPS and SPS audio encoded packets, which are passed to audio transport 333. Audio codec 332 also relays unused capacity status to other parts of the system, thus allowing the inclusion of opportunistic data. MPS and SPS data is processed by program service data (PSD) transport 334 to produce MPS and SPS data PDUs, which are passed to audio transport 333. Audio transport 333 receives encoded audio packets and PSD PDUs and outputs bit streams containing both compressed audio and program service data. The SIS transport 335 receives SIS data from the configuration administrator and generates SIS PDUs. A SIS PDU can contain station identification and location information, program type, as well as absolute time and position correlated to GPS. The AAS data transport 336 receives AAS data from the service interface, as well as opportunistic bandwidth data from the audio transport, and generates AAS data PDUs, which can be based on quality of service parameters. The transport and encoding functions are collectively referred to as Layer 4 of the protocol stack and the corresponding transport PDUs are referred to as Layer 4 PDUs or L4 PDUs. Layer 2, which is the channel multiplex layer, (337) receives transport PDUs from the SIS transport, AAS data transport, and audio transport, and formats them into Layer 2 PDUs. A Layer 2 PDU includes protocol control information and a payload, which can be audio, data, or a combination of audio and data. Layer 2 PDUs are routed through the correct logical channels to Layer 1 (338), wherein a logical channel is a signal path that conducts L1 PDUs through Layer 1 with a specified grade of service. There are multiple Layer 1 logical channels based on service mode, wherein a service mode is a specific configuration of operating parameters specifying throughput, performance level, and selected logical channels. The number of active Layer 1 logical channels and the characteristics defining them vary for each service mode. Status information is also passed between Layer 2 and Layer 1. Layer 1 converts the PDUs from Layer 2 and system control information into an AM or FM IBOC DAB waveform for transmission. Layer 1 processing can include scrambling, channel encoding, interleaving, OFDM subcarrier mapping, and OFDM signal generation. The output of OFDM signal generation is a complex, baseband, time domain pulse representing the digital portion of an IBOC signal for a particular symbol. Discrete symbols are concatenated to form a continuous time domain waveform, which is modulated to create an IBOC waveform for transmission.

Figure 10:
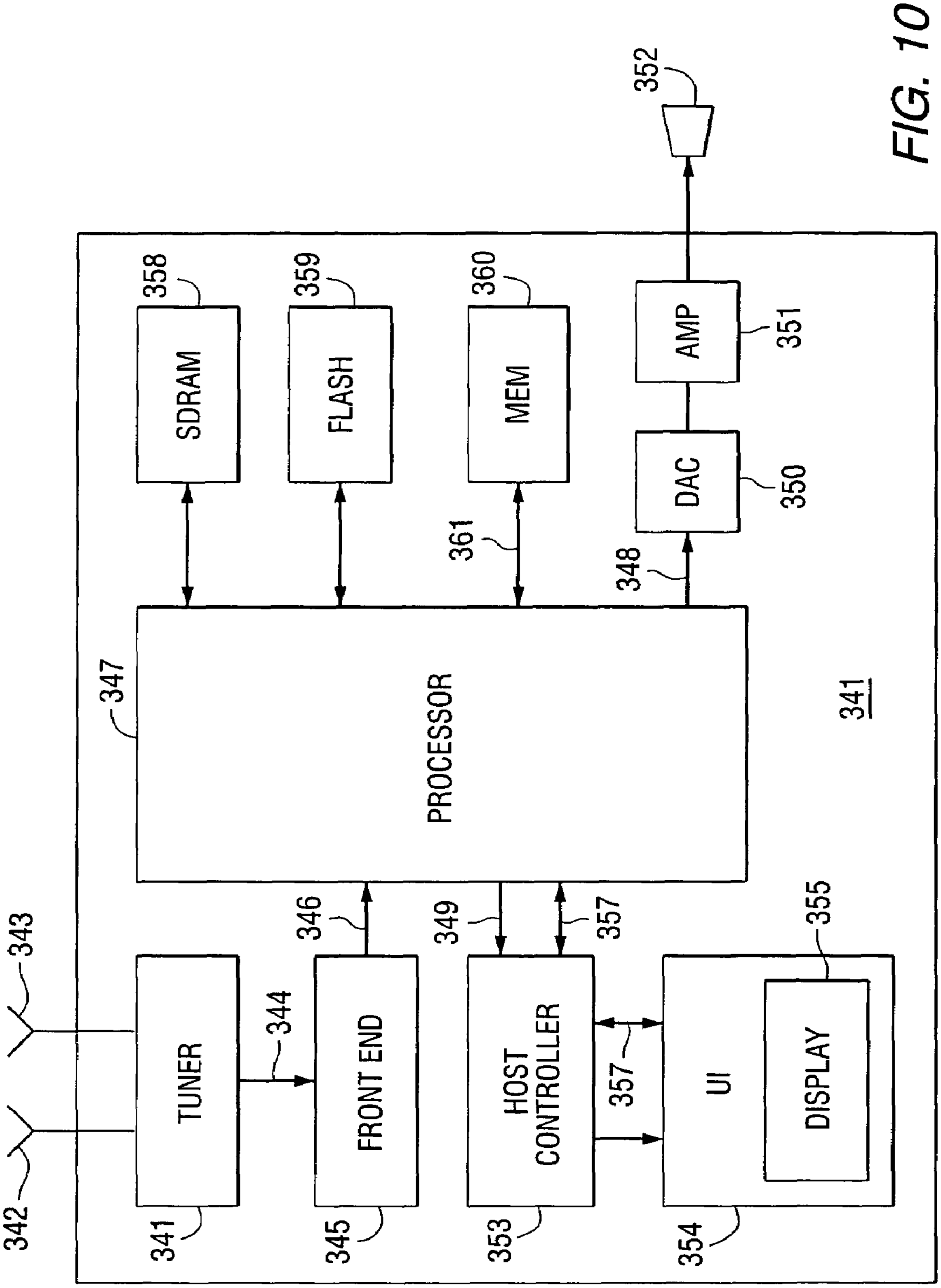
FIG. 10 is a simplified block diagram of an IBOC DAB receiver.

FIG. 10 is a simplified block diagram of an IBOC DAB receiver with components that will allow the implementation of store and replay functionality. The receiver includes a tuner 341 having inputs for connecting an AM antenna 342 and an FM antenna 343 for receiving radio signals, which may be modulated with an all-digital, all analog, or hybrid IBOC waveform. The tuner produces an intermediate frequency (IF) signal 344 that is passed to a front end circuit 345, which transforms the IF signal to baseband signal 346. A processor 347 processes the baseband signal according to the logical protocol stack described by FIGS. 9*a* and 9*b* to produce a decoded digital audio signal 348 and a decoded digital data signal 349. Digital-to-analog converter 350 converts the decoded digital audio signal to an analog signal and passes it to an amplifier 351. Output device 352, which can be one or more speakers, headphones, or any other type of audio output device, produces an audio output. Decoded digital data signal 349 is passed to a host controller 353. The host controller sends digital data to a user interface 354, which can include a display 355 for outputting visual representations of the data such as text or images. One form of a user interface is described in detail with respect to FIGS. 12-19. The host controller also exchanges status and control information 357 with the processor and user interface.

The receiver includes memories 358 and 359 for use by the processor, which may share a memory bus for communicating with the processor, and memory 360 for storing program content selected by the user. Memory 360 is preferably a non-removable storage device such as a multimedia card (MMC). Other suitable types of memory devices may be used, such as a hard disc, flash memory, USB memory, memory stick, etc.

Figure 11:
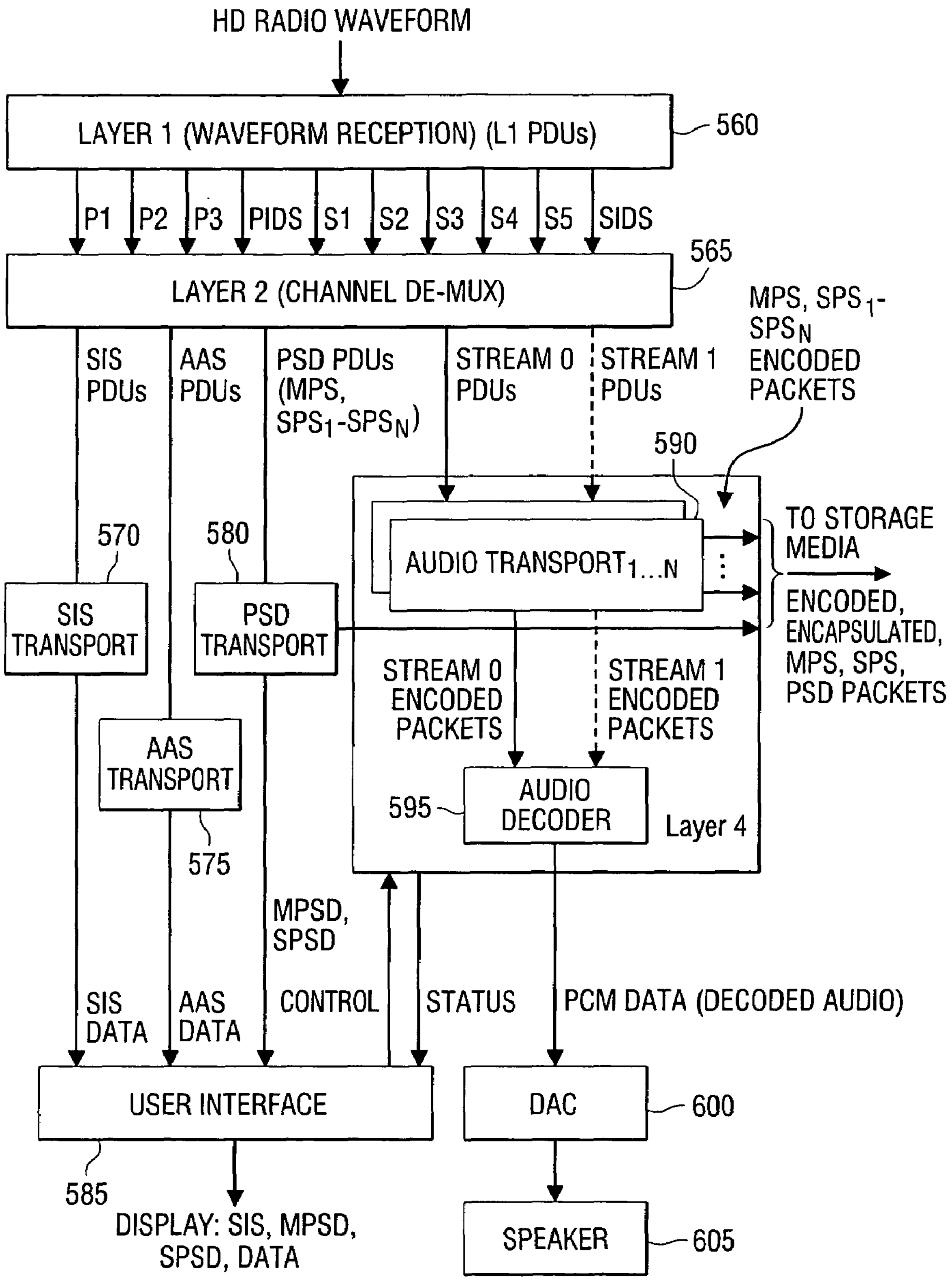
FIG. 11 is a diagram of an IBOC DAB logical protocol stack from the receiver perspective.

In addition, the host controller performs command processing functions, including file system functions and SAP (store and play, also called store and replay) control functions. File system functions can include initializing and formatting the file system used by the storage device, determining the status of the storage device, determining the status of the files stored on the storage device, acquiring file descriptions, deleting files, and updating a file directory. SAP control functions can include storing digital audio programs, enabling or disabling playback mode, playing back digital audio programs, navigating stored files during playback, and displaying playback and storage status information. Representative navigation commands can include fast forward, rewind, pause, restart, move forward to next PSD message, and move back to the previous PSD message. To store program content, the processor processes the baseband signal according to the logical protocol stack from the receiver perspective to produce encoded, encapsulated packets 361 for storage by the storage device. FIG. 11 shows the logical protocol stack from the receiver perspective for implementing store and replay functionality. An HD Radio™ waveform is received by the physical layer, Layer 1 (560), which demodulates the signal and processes it to separate the signal into logical channels. The number and kind of logical channels will depend on the service mode, and may include logical channels P1-P3, PIDS, S1-S5, and SIDS. Layer 1 produces L1 PDUs corresponding to the logical channels and sends the PDUs to Layer 2 (565), which demultiplexes the L1 PDUs to produce SIS PDUs, AAS PDUs, PSD PDUs for the main program service and any supplemental program services, and Stream 0 (core) audio PDUs and Stream 1 (optional enhanced) audio PDUs. The SIS PDUs are then processed by the SIS Transport 570 to produce SIS Data, the AAS PDUs are processed by the AAS Transport 575 to produce AAS Data, and the PDS PDUs are processed by the PSD Transport 580 to produce MPS Data (MPSD) and any SPS Data (SPSD). The SIS Data, AAS Data, MPSD and SPSD are then sent to a user interface 590. The SIS Data, if requested by a user, can then be displayed. Likewise, MPSD, SPSD, and any text based or graphical AAS Data can be displayed. The Stream 0 and Stream 1 PDUs are processed by Layer 4, comprised of Audio Transport 590 and Audio Decoder 595. There may be up to N Audio Transports corresponding to the number of programs received on the HD Radio™ Waveform. Each Audio Transport produces encoded MPS packets or SPS packets, corresponding to each of the received programs. Layer 4 receives control information from the user interface, including commands such as to store, replay, or play programs. Layer 4 also provides status information to the user interface. If a user has selected a received program for listening, the Audio Transport passes the corresponding encoded packets to the audio decoder, which decodes the packets and produces decoded audio in the form of PCM data, which is then output to a digital-to-analog converter 600 and a speaker 605 to produce an audio output. If a user has selected one or more programs for recording, then the corresponding MPS and/or SPS encoded packets produced by the Audio Transport are encapsulated with associated program specific data to produce encoded, encapsulated packets, which are then sent to a storage media, such as the memory 360 shown in FIG. 10. When the receiver plays stored content, encoded encapsulated content is presented from the storage device to Layer 4, where the Audio Transport separates the encoded audio data and the PSD. The encoded audio content is then decoded by the audio decoder, which results in decoded content (PCM samples) which are then presented to the DAC. In addition, the corresponding PSD is available to the host controller.

While a receiver preferably processes a signal through Layer 2 and the transport functions, and then stores encoded, encapsulated audio packets and corresponding program service data, as shown in FIG. 11, the receiver may process a signal through any layer of the protocol stack and then store the corresponding PDUs or packets. The remaining processing and decoding of the audio packets is then performed upon playback. As further examples, the receiver may process the signal through Layer 1 of the protocol stack and then store L2 PDUs, or it may demultiplex the L2 PDUs pursuant to Layer 2 of the protocol stack and store the resulting SIS, MPS, SPS and AAS Data PDUs. The remaining processing is then performed upon playback.

Optionally, a user can select whether the content in the files is stored as encoded, encapsulated packets pursuant to the logical protocol stack, or converted into another format such as MP3. Thus, the encoded, encapsulated packets may be transcoded into another coded format, stored in the new format, and decoded upon playback. Alternatively, the encoded encapsulated packets may be decoded, re-encoded into a new format, stored, and then decoded upon playback.

The PDUs and/or packets comprised of coded audio and/or data are referred to as encoded content. The encoded content can be derived from more than one program, such as when the digital radio signal employs multicasting. Storing encoded content allows the receiver to efficiently store a plurality of programs, or portions of programs, received on a single digital radio signal, with a single tuner. The encoded content is then subjected to further processing for playback. When the stored encoded content is derived from multiple programs, the content corresponding to any one of the recorded programs can be selected for playback at a time.

The processor shown in FIG. 10 may be a digital signal processor (DSP), microprocessor, microcontroller, an application specific integrated circuit (ASIC), or any combination of one or more of these types of integrated circuits. Moreover, the functionality of the processor and host controller as described herein may be spread across any one or more integrated circuits. In addition, the digital and analog demodulation of a received signal may be performed by the same or different integrated circuits or the receiver may optionally have no analog demodulation or processing capabilities. As a still further alternative, the receiving and storage/playback capabilities of the device shown in FIG. 10 may be bifurcated across one or more devices. For example, a docking station for a handheld playing device may contain the circuitry and functional capability of receiving and partially processing an IBOC DAB waveform in order to produce encoded packets and/or PDUs, which it then stores. When the handheld playing device, e.g. an MP3 player, docks at the docking station, the encoded packets and/or PDUs can be transferred to and stored by the player. When a user desires to listen to the stored content, it is decoded and played.

Recorded content can be stored as discrete files. The files are stored using a file allocation table (FAT) file system. New files will be written to the spaces occupied by deleted files. For example, if a user has previously recorded 12 files and then later deletes files 2, 8 and 11, a new file will utilize the newly available memory. Each file is assigned a unique file name. Any file-naming convention may be used. One system strings together information relevant to the file content, including broadcast frequency, time and date, program type, program number, program name, and station name. This information may alternatively be stored as part of the file's content. A file may also include parameters such as total file time, codec mode, number of compressed (coded) streams present, the amount of audio gain for the receiver to apply to the digital audio of a currently selected program, bit rate, program sound processing, program access permissions, content ID, number of PSD packets, and navigation flags. The maximum file size is based on the amount of memory storage available. The memory used can be of any size suitable for storing content, and is preferably at least 512 MB. Given a data rate of 96 Kbps, a memory of 512 MB would allow storage of approximately 10 hours of program content.

Program service data messages, when PSD is available, and/or ID3 tags are preferably stored with each file so that during playback a user can be provided with a description of the recorded content, including information such as title, artist, album, genre, and other information. For further information regarding ID3 tags, see the standard and specification documents available at www.id3.org. While playing back the stored content, a Get_PSD command can be used by the host controller to retrieve PSD messages, which are then decoded by the host controller. If the host controller is retrieving PSD information during the recording of a live broadcast, then PSD messages for the digital audio program will be stored. If the host controller is not retrieving PSD information during the recording of a live broadcast, PSD messages for the digital audio program will not be stored. If the station is not transmitting any PSD information, then zero PSD messages will be stored during the recording of the live broadcast. PSD messages may also be used to advance through the stored files for playback. During active recording, the PSD source is in the live digital audio stream. During playback, the PSD source is in the stored digital audio file. The display of "live" or "current" PSD information is not possible when in the playback mode. If active recording and playback of the same program are occurring at the same time and the Get_PSD command is issued, the host controller will receive the PSD message that is stored with the recorded file. The current PSD message that is associated with the active recording (on-the-air) will not be sent to the host controller. If active recording and playback for different programs are occurring at the same time and the Get_PSD command is issued, the host controller will receive the PSD message that is stored with the recorded file. The current PSD message that is associated with the active recording (on-the-air) is not accessible and subsequently will not be sent to the host controller.

Preferably, a user has several options for recording program content, which can include AM or FM digital content and main or supplemental programming. For example, by pushing the appropriate button on the user interface of the receiver, a user can begin to record a program as it is being broadcast. The receiver records the content until the memory is full, the signal is lost or tuned out, or the user stops the recording. A user can also program a predetermined duration for the recording. Thus, when a listener hears a program being broadcast and desires to begin recording, the receiver will record the program until the predetermined duration has expired, the memory is full, the signal is lost or tuned out, or the user stops the recording. A user can also schedule the recording of a program on a particular station starting at a particular date and time and lasting for a particular duration. At the preset time, the receiver automatically tunes to the selected station and begins recording for the indicated duration until the station is tuned out, the memory is full, or the listener stops the recording.

A user can concurrently record multiple programs (i.e., including multicast content) broadcast on a single channel. The user can listen to a main program while recording one or more supplemental programs, listen to a supplemental program while recording a main program and one or more supplemental programs, or listen to one supplemental program while recording one or more supplemental programs and/or a main program. The number of programs that can be recorded simultaneously is determined by the number of supplemental programs being broadcast at a particular channel. In one example, an IBOC DAB waveform can support up to eight multicast programs on a single channel, all of which can be recorded at one time.

The IBOC DAB signal can be processed as described above to obtain demultiplexed main program service and supplemental program service encoded packets as well as the corresponding program service data. If the user desires to listen to one of the main or supplemental programs being broadcast, then the corresponding encoded packets are decoded, converted from digital to analog, and sent to an audio output device. If the user desires to record one or more of the main or supplemental programs being broadcast, then the corresponding encoded packets for each of the desired programs are stored in separate files along with the corresponding program service data in the format as described above. Thus, each program selected by the user for recording is stored in a separate file that can later be selected by the user for playback, at which time the encoded packets are decoded, converted from digital to analog, and sent to an audio output device.

A user can also program the receiver to record supplemental programs based on program genre or program type preference selected by the user. The receiver will then monitor the received digital radio signal for the desired program genre or a program type and store that program genre or a program type when it is detected. For example, the receiver can automatically record a supplemental program when it is traffic-based. To implement this functionality, the receiver stores a listener's preferences and automatically records any supplemental programs that meet these preferences. The recording automatically stops whenever the program's genre changes. A receiver can use the Station Information Service (SIS) to identify the type of programs broadcast on a particular channel. SIS preferably contains a field for identifying program type. For example, an 8 bit Program Service Type field corresponds to the nationally defined Radio Broadcast Data System (RDBS), as described in the NRSC-4-A standard. A user can also select the duration and frequency (hourly, daily, weekly, etc.) for recording program content of a particular genre, and the user can select to have a new file replace a previously recorded file of the same genre so that during playback the user only listens to the most current program content.

Moreover, a broadcaster may elect to use available bandwidth to broadcast non-streaming program objects, such as pre-recorded programs. For example, a broadcaster may create or receive recordings of various television or radio programs. The broadcaster can then broadcast these programs on an IBOC waveform and a receiver can store those programs that a user desires, based on associated data such as title or program type. Once a complete program object has been received and stored by the receiver, the user can select that program for playback. As described above, the program would be stored as encoded, encapsulated packets which are decoded upon playback. Because the program objects are not being broadcast for real-time listening, the content can be transferred as a unit in faster or slower than real-time depending on available bandwidth, or it may be divided up into smaller pieces and then reassembled by the receiver.

In another embodiment, when the user is listening to previously stored content, the receiver can scan a plurality of digital radio signals for the desired program genre or a program type and then store that program genre or program type when it is detected. This automatic scanning and recording can also be implemented if the user is not listening to currently received or stored content. Thus, a single tuner can perform the scanning function if the receiver is playing back a stored file or otherwise is not tuned to a particular station for listening by the user.

To allow still further recording capability, the receiver may include an additional tuner that can scan the available broadcasts for content that matches a user's preferences. Adding one or more additional tuners also allows a user to record a program on one station while listening to a program on another.

In one embodiment, when recording, the receiver display includes a visual indication of the quality of the audio being received and recorded. If the digital signal is lost, then the recording will automatically stop and recommence when the digital signal is acquired, unless the user chooses not to do so by setting corresponding user preferences. The receiver display also shows a memory usage indication to the user, such as the amount of memory used or remaining, or the amount of time used or remaining. Based on this indication, the user can control the amount or duration of additional recording. When the memory becomes full, the receiver can display an appropriate indication to the user. If the memory becomes full during recording, the recording will automatically stop unless an auto-erase function has been enabled. When the auto-erase function is enabled, the receiver automatically deletes recorded content or stored files when the memory is full, based on various criteria such as the type of file, the age of the file, or whether the file has been marked as low or high priority or "do not erase" by the user. If auto-erase is not enabled, then when the memory is full, the user is notified that files should be manually deleted. The user can also select the number of days to store a particular file. After the specified number of days has passed, the stored file is automatically deleted.

To replay stored program content, the processor receives encoded audio and data from the storage device and further processes the signal according to the logical protocol stack in order to produce decoded audio and data 348 and 349. Playback is independent of channel conditions; thus, the receiver does not need to be tuned to a particular station. Moreover, a receiver in playback mode can use the same blend algorithm as live audio such that the receiver can blend to mute if the audio quality is poor. The receiver may display an indication of the quality of a stored audio file such as by expressing a percentage of the compressed audio in a particular file that is bad. Based on this indication, the host controller may not play back a file that reaches a certain percentage threshold, such as 50%. Preferably, a user has several options for playing back stored content. For example, a user could select to play a specific file or to play all stored files continuously. A user can also navigate through stored content in various ways in order to select files for playback. One such way is by using rewind and forward functions. For example, a fast forward function allows a user to skip from one file to the next or to advance through a file in intervals, such as 10, 30 or 60 second intervals. Similarly, a rewind function allows a user to skip to a previous file or to go back within a file in intervals, such as 10, 30 or 60 second intervals. A user can also move forward to the next PSD message, or move backward to the previous PSD message. In either case, the receiver will begin playback from the location in the file corresponding to the newly selected PSD message. To facilitate a user's selection of which file to play, the receiver can display stored files in a variety of ways, such as by date and time of recording or program title, for example. A user can also scan the program service data of stored files in order to preview the contents of a stored file and then select a file desired for playback. When a listener desires to stop listening to a particular recorded program, the user may insert a marker, which will allow the user to resume listening to the file or content piece from the marked position, even after power-off, instead of replaying the file from the beginning.

The above-described receiver provides audio output in two modes: Live mode and Playback mode. When the receiver is in Live mode, the audio source is a real-time over-the-air signal, which the user can also record. In Playback mode, the audio source is a stored digital file. When in Playback mode, the receiver may be tuned to a particular station and the program content from that station can be recorded.

Figure 12:
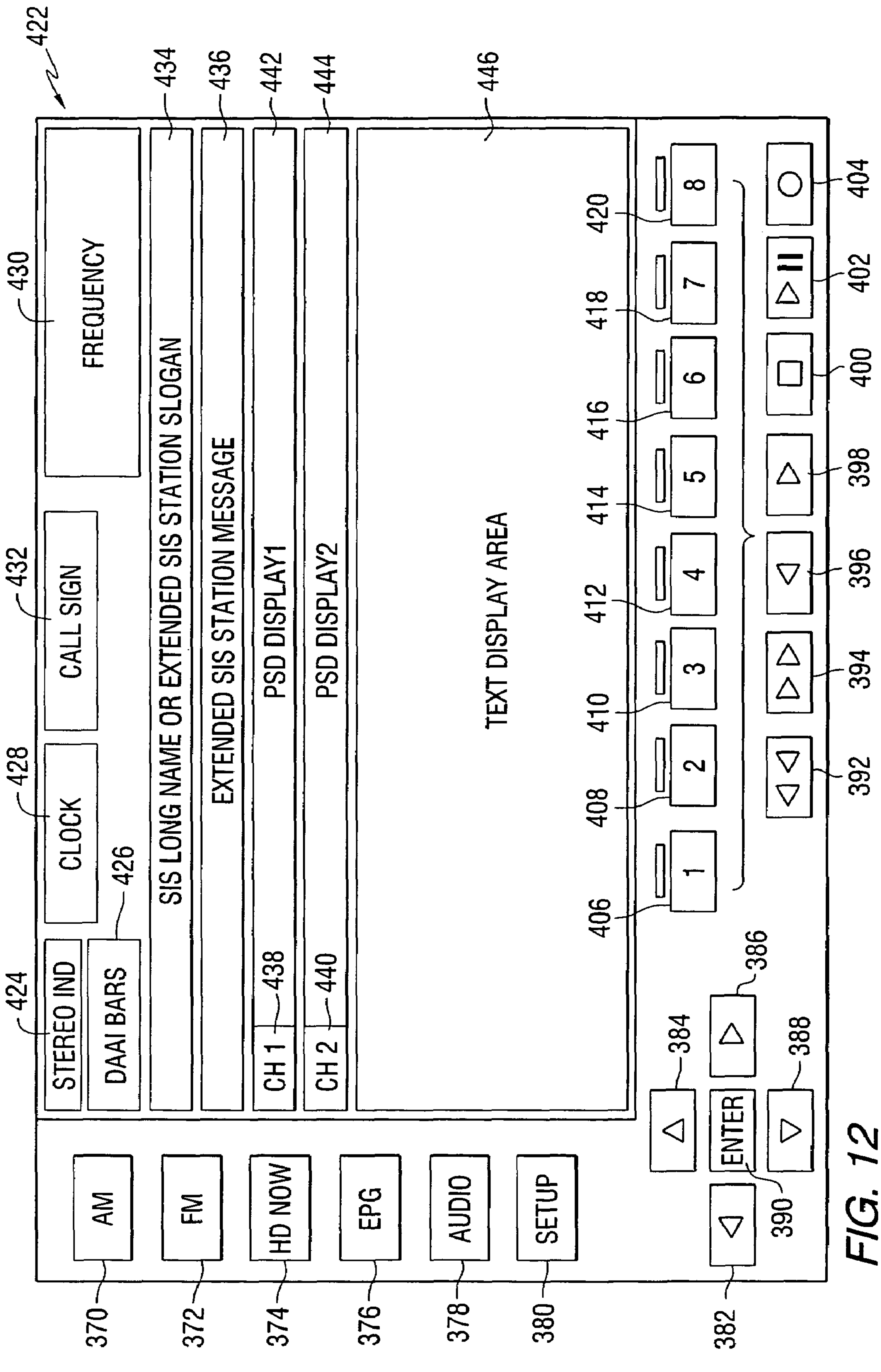
FIGS. 12-19 show a representative user interface of the receiver of FIG. 10 with various screen displays.

FIG. 12 shows an example of a user interface for an IBOC DAB receiver capable of handling advanced application services (AAS) such as store and replay. The user interface includes a plurality of keys (also referred to as buttons) that are used to control the operation of the receiver. The operating mode is selected using one of the mode control buttons 370, 372, 374, 376, 378 or 380. The AM button 370 sets the tuner to AM mode if the receiver is in FM. When the AM button is pressed while playing back a recorded file, playback is stopped, a marker is inserted to indicate the location in the file where the playback was stopped, and the receiver returns to the AM station last listened to. The FM button 372 sets the tuner to FM mode if the receiver is in AM. When the FM button is pressed while playing back a recorded file, playback is stopped, a marker is inserted, and the receiver returns to the FM station last listened to. The HD Now™ button 374 displays a player screen with a listing of the recorded files. The Electronic Program Guide (EPG) button 376 displays EPG information. The EPG schedule may be displayed on the main screen, or on a separate EPG screen. The AUDIO button 378 displays an audio processing display window. The SETUP button 380 displays a main menu screen. The user will be able to navigate to sub-menus from this screen. In one example, menu options include a Date/Time setting, Auto-Tune HD station settings, Store and Replay preferences, and a view of the radio hardware and software configuration. Buttons 382, 384, 386, 388 and 390 are menu or listing navigation controls. The UP ARROW button 384 can either scroll up menu selections or increment a configuration parameter. The DOWN ARROW button 388 can either scroll down menu selections or decrement a configuration parameter. The LEFT ARROW button 382 can scroll menu selections to the left. The RIGHT ARROW button 386 can scroll menu selections to the right. The ENTER button 390 is used to accept the highlighted configuration parameter or exit the menu screen. This button is also used to display the Program Service Data (PSD) of a selected recording. Buttons 392-404 are tuner or media player controls. Buttons 406-420 are Tuner Preset/Channel Select buttons. If the receiver is in the Live mode, these buttons act as AM/FM tuner presets. If the receiver is entering HD Now™ mode, these buttons will allow the user to select which channels (MPS & SPS) to record. Once the user selects the Record button 404, these buttons indicate the programs available for recording. The Seek Down/Skip Previous button 396 will seek down to the next AM or FM station if the receiver is in Live mode or will skip to the previous song if the receiver is in HD Now™ mode. The Seek Up/Skip Next button 398 will seek up to the next AM or FM station if the receiver is in Live mode or skip to the next song if the receiver is in HD Now™ mode. The Tune Down/Rewind button 392 will tune down to the next AM or FM station or select the next lowest multicast program if the receiver is in the Live mode or set the media player to the rewind state if the receiver is in HD Now™ mode. The Tune Up/Fast Forward button 394 will tune up to the next AM or FM station or select the next highest multicast program if the receiver is in the Live mode or set the media player to fast forward state if the receiver is in HD Now™ mode. The Stop button 402 stops the playback of a selected file. The STOP button can also be used to stop the recording of all programs if the user is recording multiple programs being multicast by the same station. The Play/Pause button 400 toggles the media player to either a play or a pause state while replaying a selected recorded file. The Record button 404 allows the user to instantly record the program that is currently being listening to. An indicator, which can be close to or on the button, can light up (for example, glow red) to indicate that recording is in progress. If a signal is not present the Record button has no effect.

The Tuner Preset/Channel Select buttons 1 to 8 also prompt the user to select any additional programs to record, if available. An indicator corresponding to the multicast channel will light up (for example, glow yellow) to indicate that the program is available to record. Recording of any additional programs can be initiated by pressing the Tuner Preset/Channel Select button for the respective program.

Recording for any program can be stopped by manually pressing the Tuner Preset/Channel Select button for the respective program or by the recording durations entered in the HD Now™ Recording Preferences menu. Recording for all programs can be stopped by manually pressing the Stop button.

The user interface also includes a display 422 that provides various information to the user. The Stereo Indicator 424 displays "Stereo" if no digital signal is detected, and the radio is receiving an analog FM stereo signal. The digital audio availability indicator (DAAI) Bars 426 indicate the HD Radio™ signal strength if an HD Radio™ signal is being received. The Clock field 428 displays the time of day in hours and minutes (HH:MM). The Frequency field 430 indicates the tuner's current RF frequency setting. The Call Sign field 432 displays the SIS station short name on AM and FM HD Radio™ stations or RBDS call sign parameter on analog FM stations. If the HD Radio™ station uses extended SIS, the Extended SIS Station field 434 displays the station slogan, otherwise it displays the SIS long name. If the HD Radio™ station uses extended SIS the Extended SIS Station Message field 436 displays the station message, otherwise this field is blank.

Channel (CH) Indicators 438, 440 indicate multicast program numbers. The multicast program that the user is currently listening to can be highlighted, for example, in yellow. In this example, a maximum of two programs can be displayed at one time, so if the station is broadcasting three or more multicast programs, the program numbers will scroll.

Program Service Data (PSD) Display fields 442, 444 indicate the song title and artist if an HD Radio™ signal is being received. If in the analog FM mode and the station is transmitting RBDS information, PSD Display 1 will display the RBDS radio text message. The PSD information of all the available channels on a multicast station will be displayed. The PSD display preferences can be set by the user.

The Text Display area 446 can be used to display 'prompt' messages where user interaction is required. It could also be used to display the EPG or other text (traffic, weather, stocks, etc.). This region of the display screen can also be used to display the album art of the song being played based on user preferences.

The listener will be able to set the display preferences as chosen. For example, the listener can choose to display the PSD information of all the multicast programs on a particular frequency or can choose to display the associated album art of the song being broadcast.

Figure 13:
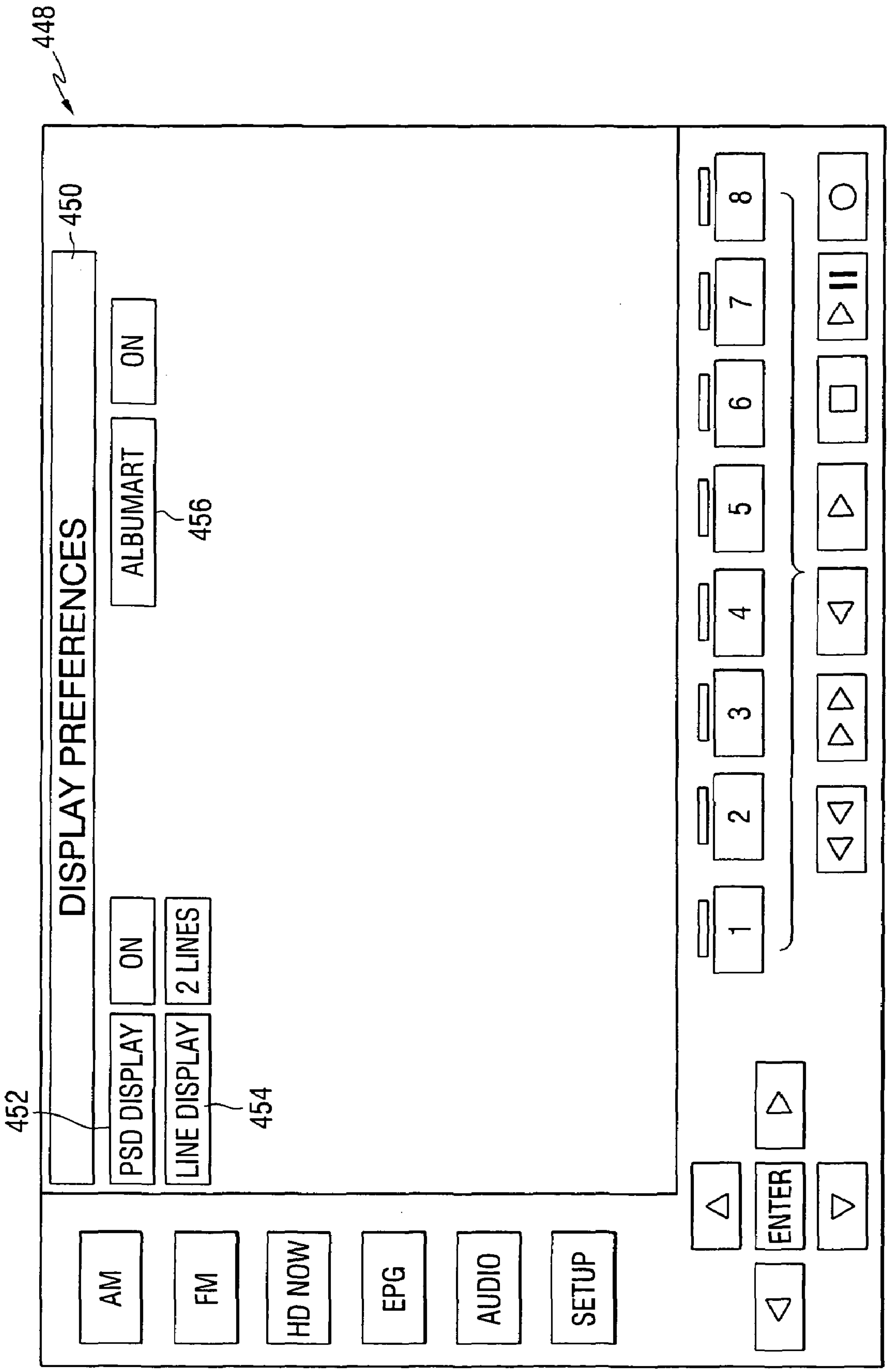

The store and replay preferences in the receiver can be set by pressing SETUP and selecting the Display Preferences. FIG. 13 illustrates the Store and Replay preferences display 448. The title field 450 shows the display title. In this example, using PSD Display button 452, the PSD Display can be set to ON or OFF if the listener wishes to display PSD information or not. The number of lines in the PSD Display can be set to 1 Line or 2 Lines using the Line Display button 454. This is for the current channel being listened to. The listener can also choose whether to display the Album Art or not using the Album Art button 456. The control keys (up, down, right and left arrows) can be used to scroll through the menu items. The ENTER key is used to choose a selected menu item and to display the available options. The UP and DOWN control keys are used to select a value for the menu item. The ENTER key is used to input the selected value for that particular menu item from a drop-down list. The BACK key is used to return to the previous menu.

Figure 14:
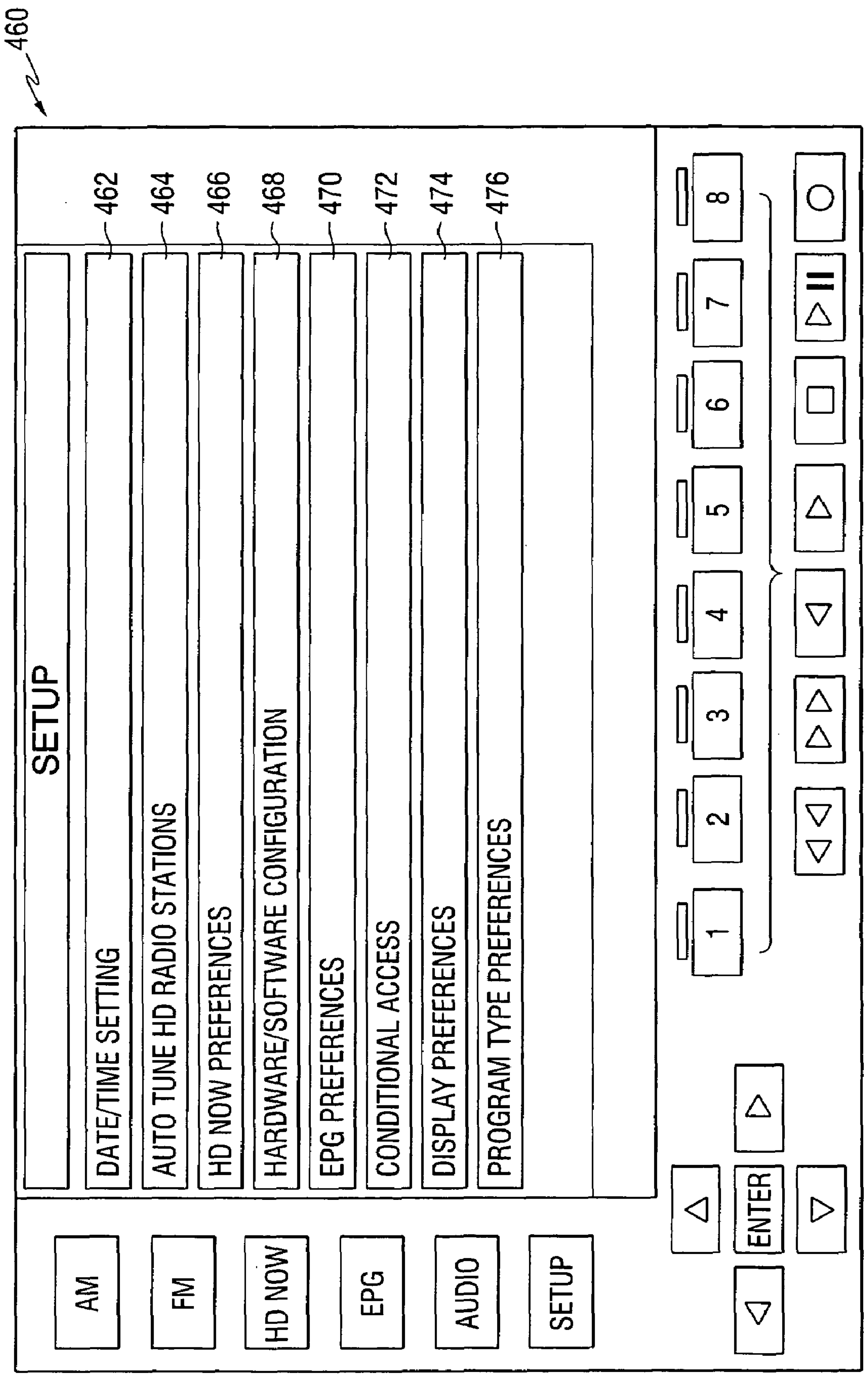

FIG. 14 shows the SETUP display 460. The display includes a plurality of fields 462-476 that are used to implement various options, including date/time settings 462, auto tune 464, HD Now™ preferences 466, hardware/software configuration 468, EPG preferences 470, conditional access 472, display preferences 474, and program type preferences 476.

Figure 15:
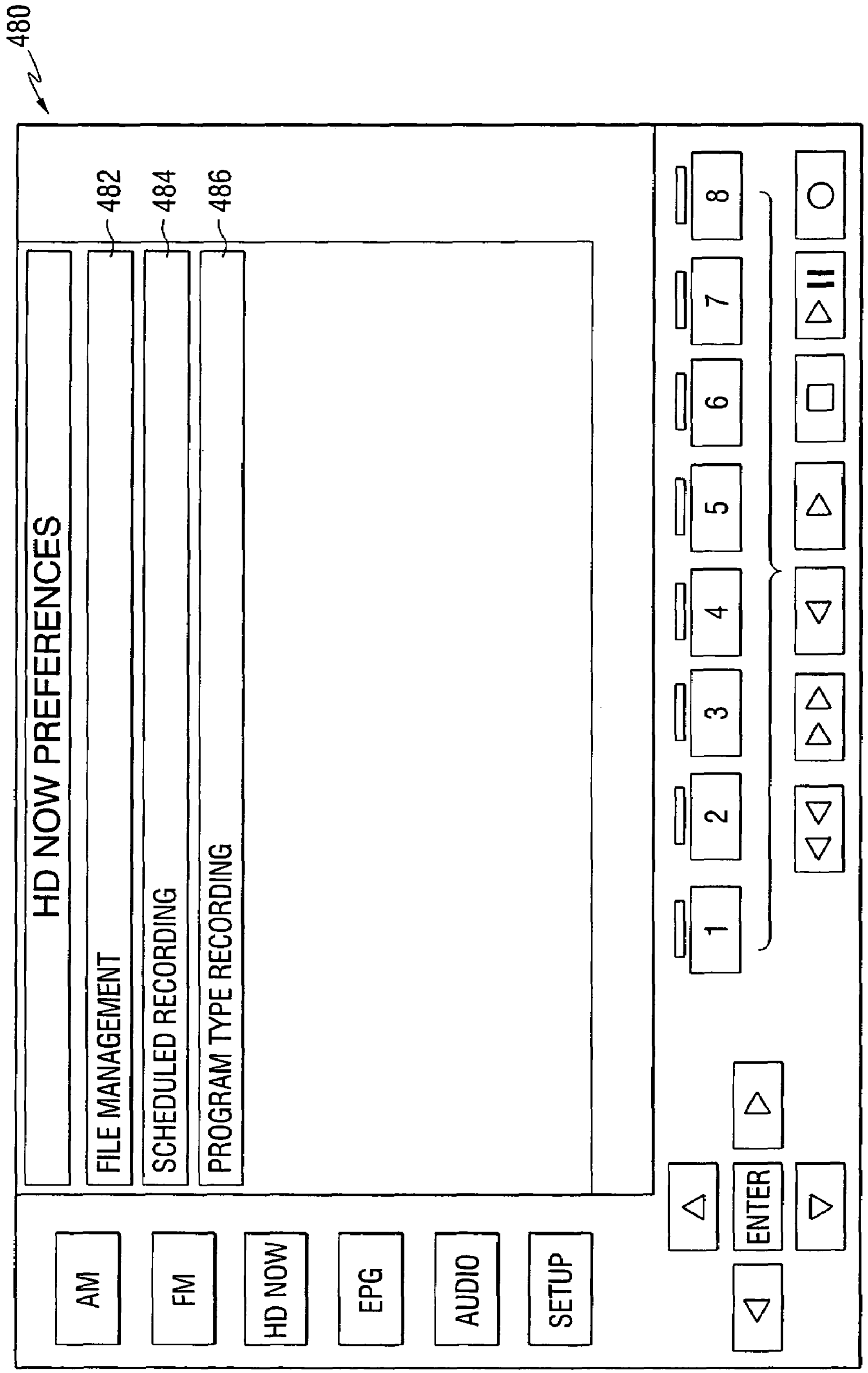

FIG. 15 shows the HD Now™ PREFERENCES display 480. This display includes several fields 482-486 that are used to select additional options. The listener can set up preferences for management of the stored files in the receiver by pressing SETUP, selecting HD Now™ PREFERENCES, selecting FILE MANAGEMENT, and adjusting the file management settings. File Management field 482 allows the user to delete one or more stored audio files, format the storage device, and enable auto-erase of audio files. If a recording is in progress and the storage device is nearly full, the auto-erase function will remove files without user intervention in order to free up memory space. The files may be deleted based on age, with the oldest files being deleted first, or based on the number of times played back, with rarely played files being deleted first. The Scheduled Recording field 484 allows a user to schedule one or more program recordings. The user enters data such as time, date, frequency, multicast program number, duration and occurrence of the recording. The occurrence can be configured as "one time only," "daily," "Monday through Friday," or "weekly," for example. The Program Type Recording field 486 allows a user to instruct the receiver to record programs based on type or genre.

Figure 16:
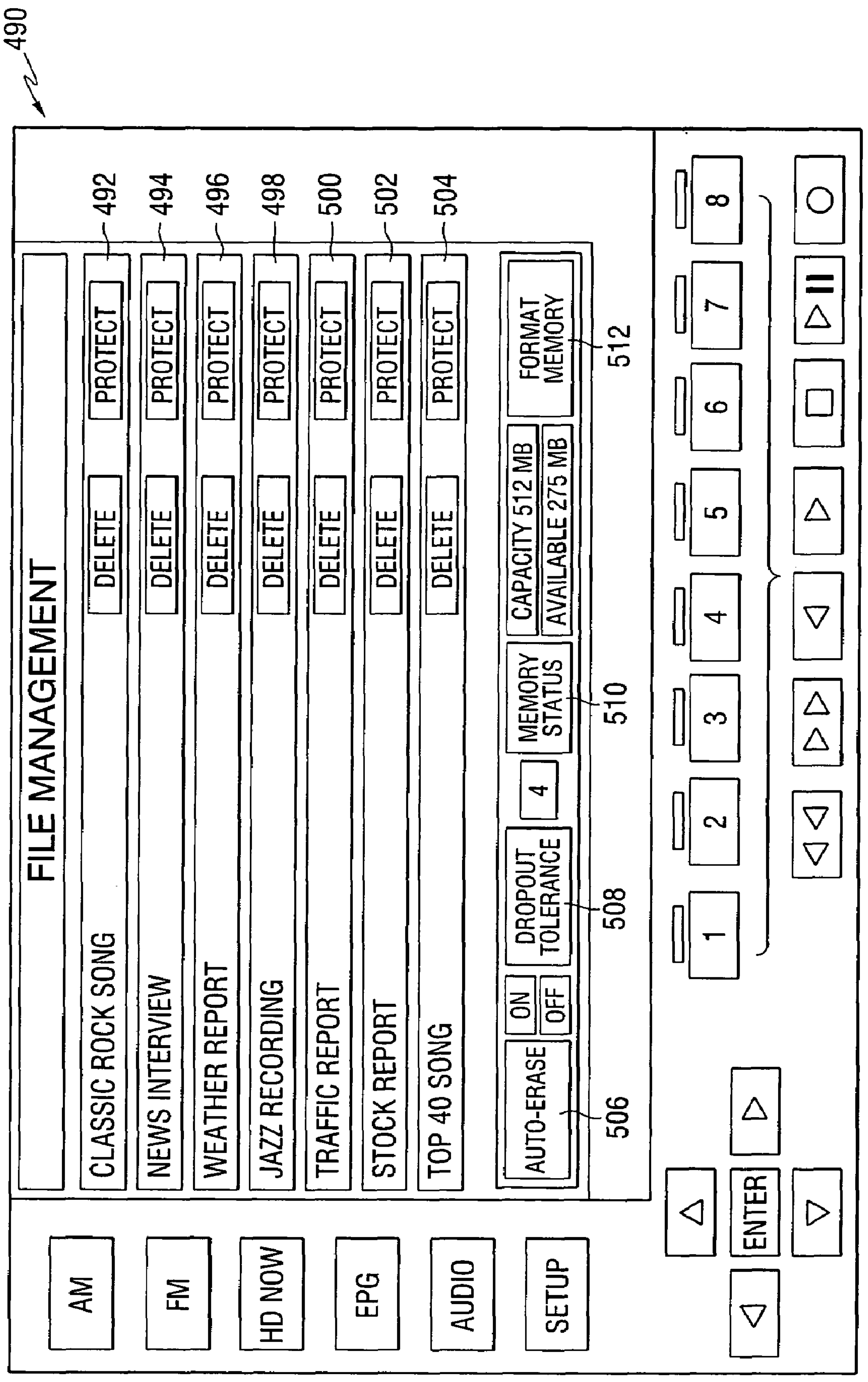

FIG. 16 shows the file management display 490. This display shows exemplary files 492-504 that are stored in the radio. An Auto-Erase feature is activated by button 506. If this feature is set to ON, every time the receiver storage memory is full, it will automatically delete the oldest x (for example, 3) number of files based on the time of recording. If the feature is set to OFF, when the receiver storage memory is full, the listener will be provided an indication to delete files manually. In this example, the Default Value is: OFF. The listener is presented with an option to delete or protect selected files. Files can be deleted by selecting this button and pressing the ENTER button. The Memory Status field 510 gives an indication of the available memory capacity and the available memory. The Dropout Tolerance 508 controls how many times the receiver will tolerate dropouts. A dropout can occur when the quality of a received digital radio broadcasting signal falls below a certain threshold, such as one based on signal to noise ratio, interference, or other signal distortion. If the receiver is recording and the frequency or station tunes out, the receiver will create a new file in order to continue recording the current program. This may be initiated by a signal dropout. In this example, the default value is 4, meaning if a dropout occurs 4 times consecutively while a program is being recorded or during a specified time frame, then recording will be stopped. The allowed dropout tolerance values can range from, for example, 0-10. By clicking on the Format Memory button 512, the listener will be able to format the entire on-board memory of the receiver. The control keys (up, down, right and left arrows) can be used to scroll through the menu items.

Figure 17:
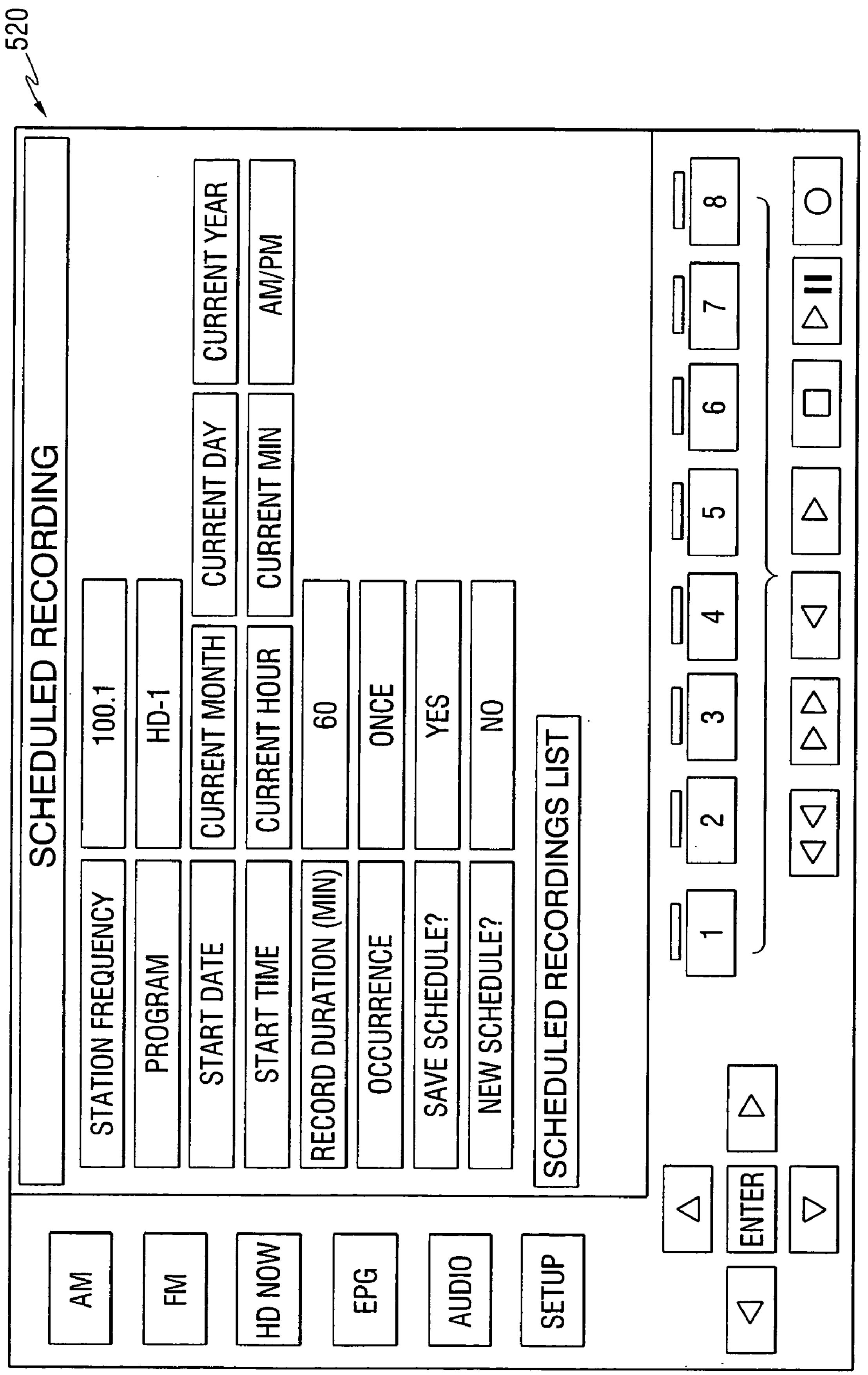

To schedule recording at a preset time on a selected station or frequency, the user can access the preferences menu by pressing SETUP, selecting HD Now™ PREFERENCES, selecting SCHEDULED RECORDING, and entering the Scheduled Recording settings. FIG. 17 shows the Scheduled Recording screen 530. The settings include the Frequency of the desired AM or FM station, the program Channel Number (1-8), the start date (the current date is displayed as the default), the start time (the current time is displayed as the default) and the duration of the recording. The duration parameter allows the user to specify how long to record a program. The default duration parameter indicates that recording will not stop unless the user presses the Stop button, the user tunes to a different frequency, or there is no remaining storage space. Apart from the default, the user has the option to select values of 30, 45, 60, 90, 120, or 240 minutes. This allows the recording to stop after a specified amount of time, without requiring the user to press the Stop button. The Occurrence parameter specifies the frequency of the particular scheduled recording. The options are Once, Daily, or Weekly. The user can be prompted with a Save Schedule query, to which the user responds by indicating whether the user wants to save the entered schedule: Yes or No. The New Schedule parameter allows the user to create another schedule-based recording event: Yes or No. If Yes, then another scheduled recording screen is presented. Ten minutes before the scheduled time, the user is presented with a prompt that the scheduled recording is about to commence at the preset station and a choice whether to continue the recording or cancel. If no action is taken, then the recording will continue as default. If chosen to continue, at the scheduled time, the receiver automatically tunes to the preset station and begins recording. If the scheduled recording is set for a channel on a multicast station and the user is currently listening to that station, then recording of that channel will begin and an indicator will indicate that a multicast channel on that station is being recorded. If the receiver is tuned to a particular station and making a recording that will conclude prior to the next scheduled recording time, the prompt is displayed 10 minutes before the next scheduled recording time. At the scheduled time, the receiver automatically begins the scheduled recording. If the listener is recording the current station and has scheduled a concurrent recording on a different channel (corresponding to a different station), then the listener is presented with a prompt that is displayed 10 minutes before the scheduled time and a choice whether to continue the current recording or stop that recording in order to allow the scheduled recording to begin. If the listener is in playback mode and listening to a stored file, at the scheduled time, the prompt is displayed 10 minutes before the scheduled time and the receiver automatically tunes to the preset station and begins recording. The recording is stopped after the scheduled duration or the STOP button is pressed. The recording will also stop if the listener tunes to another station or frequency. The recording will also stop if the storage memory is full and the auto-erase option is not enabled.

Figure 18:
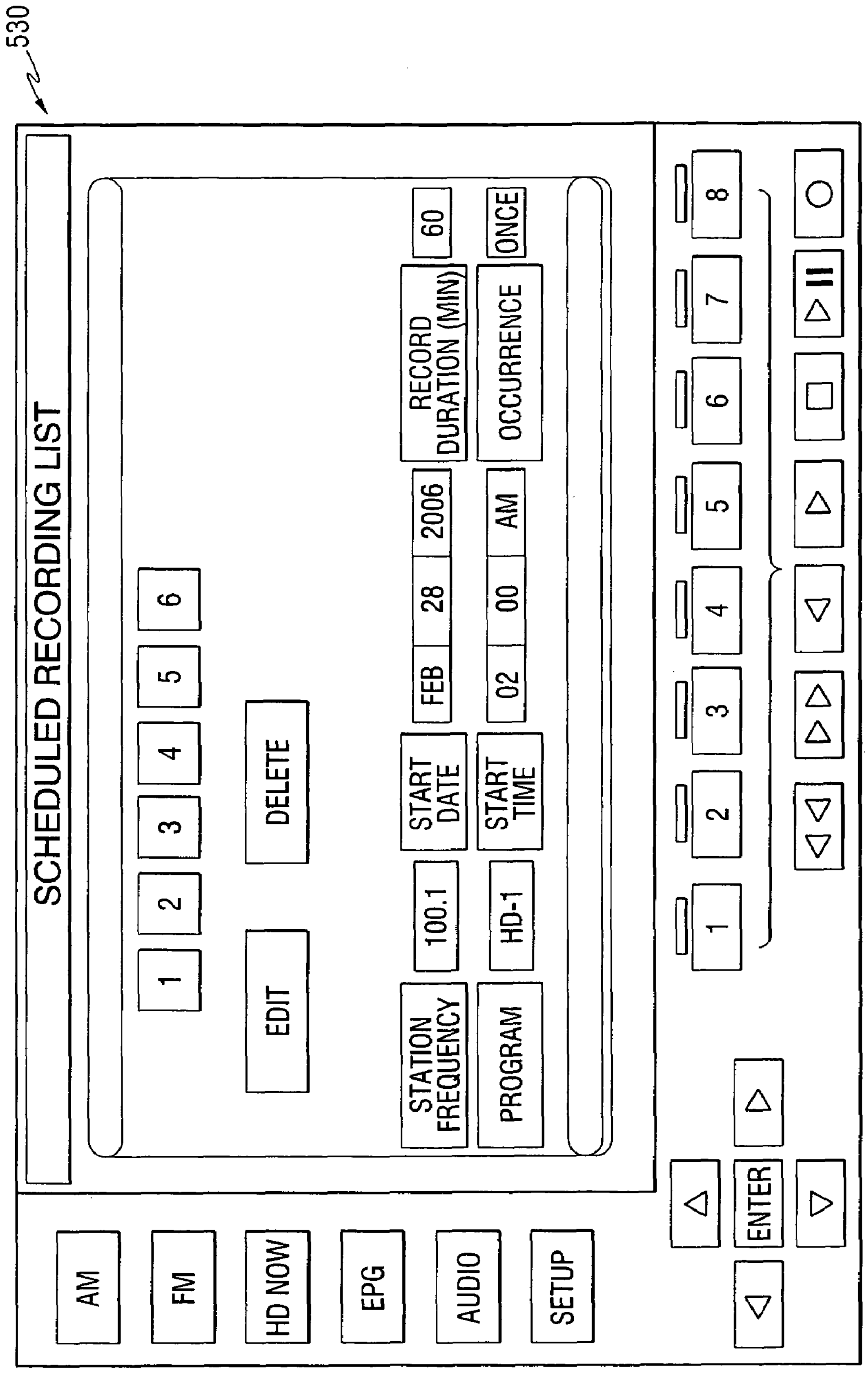

A Scheduled Recordings List display 530 allows a listener to show all the scheduled recordings setup on the receiver. FIG. 18 shows the scheduled recordings list screen where the user can choose to edit the scheduled recording or delete it. The control keys (up, down, right and left arrows) are used to scroll through the menu items. The user can press the ENTER Key to choose a selected menu item and to display the available options. The up, down control keys are used to select a value for the menu item from the drop-down list. The ENTER Key is used to input the selected value for that particular menu item. The BACK Key is used to return to the previous menu. In an example programming sequence, the control buttons are used to navigate to the field for Record Duration (min). The Enter Key is used to display the options—Default, 30, 45, 60, 120, 240. For example, the desired duration of 30 minutes can be chosen and the ENTER Key is pressed to input the value of 30 minutes Recording Duration.

Figure 19:
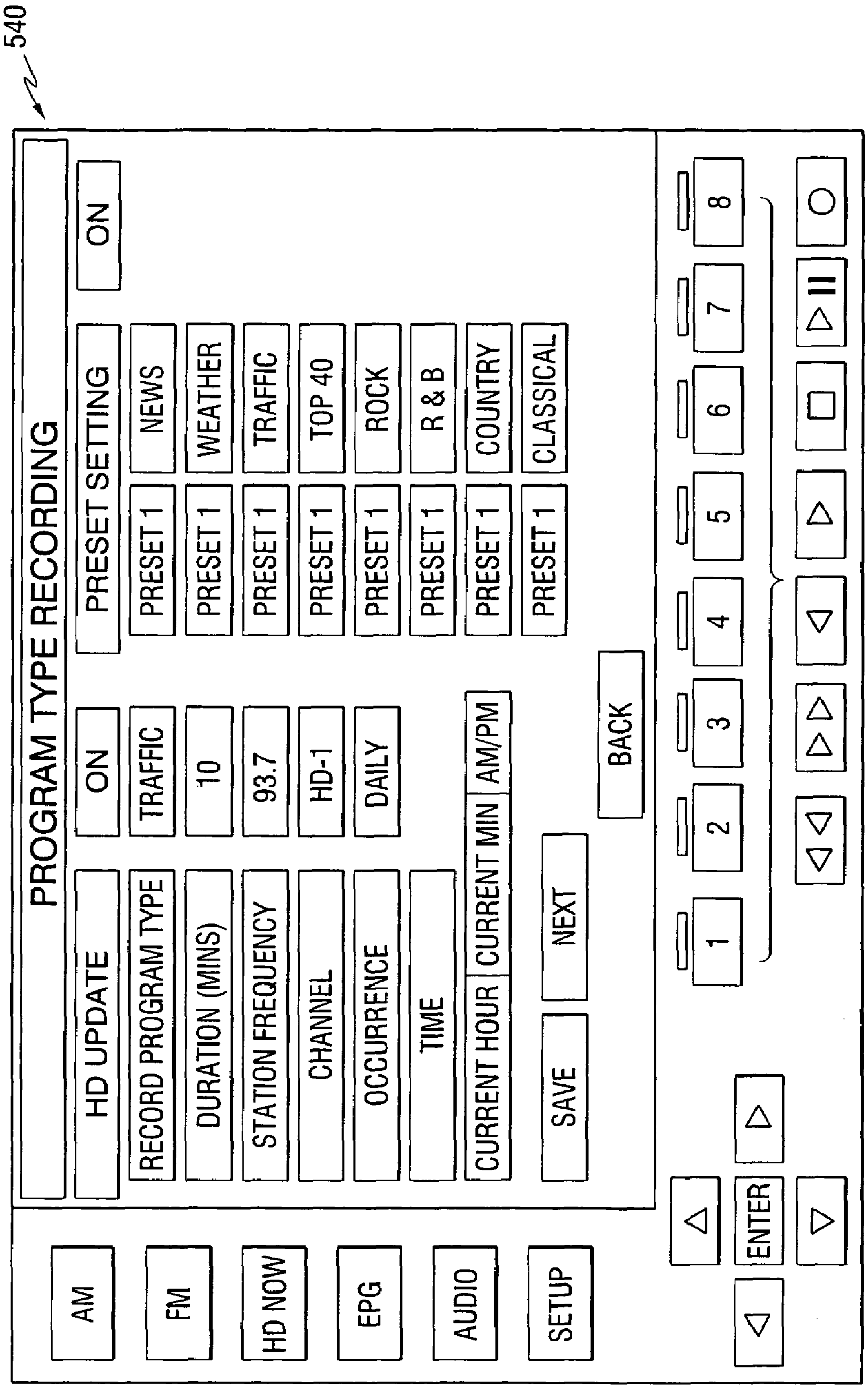

Program type preferences can be set by using the Setup menu to display Program Type preferences. Then the listener can input his/her choices for using the Program Type to schedule a recording or to program presets. This is accomplished by pressing SETUP, selecting HD Now™ PREFERENCES, and selecting PROGRAM TYPE RECORDING. FIG. 19 shows the Program Type Recording Screen 540.

A PRESET SETTING is provided to allow the listener to PRESET program types—ON or OFF. Various program types can be preset. The listener may automatically record the program or channel (MPS or SPS) currently being listened to by pressing the RECORD button and the appropriate CHANNEL SELECT button. The duration of recording can be changed in fixed intervals by repeatedly pressing the UP, DOWN and ENTER Control Keys. First the user would press the RECORD button. Then the CHANNEL SELECT buttons for the available channels are lit yellow, and the memory usage indicator is displayed for 10 seconds. The CHANNEL SELECT button No. 1 can be pressed to record the current station on Channel 1. The recording will commence for the default duration, which is until the listener presses STOP, a tune-out occurs, or the memory is full. The indicator for CHANNEL SELECT button No. 1 will be lit red.

To change the duration of recording, the user can press the ENTER Control Key, and then press the UP Control Key. A default value of for example 30 minutes will be displayed. The duration of recording can be chosen using the UP, DOWN and ENTER Control Keys in values of: 30, 45, 60, 90, 120, 240 minutes. Then the ENTER button can be pressed to choose the duration desired.

To stop recording, the selected CHANNEL SELECT button or the STOP button can be pressed. The recording will also stop if the listener tunes to another station or frequency.

The recording will also stop if the storage memory is full and the auto-erase option is not enabled.

To record an alternate program or programs when a station is multicasting, the listener will be able to record any program on the same station in addition to the program being listened to. The listener will also be able to commence multiple recordings of various multicast programs. The listener can record supplemental programs while listening to the main program or other supplemental programs.

To initiate recording, the user can press RECORD. Then the CHANNEL SELECT buttons for the available channels will be lit yellow, and the memory usage indicator is displayed for 10 seconds. Next the user presses the desired CHANNEL SELECT button to record the desired channel. The recording will commence for the default duration, which is until the listener presses STOP, a tune-out occurs, or the memory is full. The indicator for recorded CHANNEL SELECT will be lit red.

To change the duration of recording, the user can select the desired channel being recorded using the UP, DOWN Control Key, and press the ENTER Control Key. The default value that is displayed is 30 minutes. Then the duration of recording can be chosen using the UP, DOWN and ENTER Control Keys in values of: 30, 45, 60, 90, 120 or 240 minutes. Next the ENTER button is pressed to choose the duration desired.

To stop recording, the user can press the selected CHANNEL SELECT button. To stop recording for all the channels being recorded, the user can press the STOP button. The recording will also stop if the listener tunes to another station or frequency. The recording will also stop if the storage memory is full and the auto-erase option is not enabled.

The channel being listened to can be highlighted. The channels being recorded can display a small Record Indicator. The user can press the desired CHANNEL SELECT button to record the desired channel. The recording will commence for the default duration, which is until the listener presses STOP, a tune-out occurs, or the memory is full.

The channel being listened to will remain fixed on the display. The remaining available channels will scroll vertically as required. If desired, the listener can tune to the desired channel using the Control Keys or the Tune Up/Tune Down Keys and press RECORD to begin recording the channel tuned to.

To play back recorded Files, the listener would press the HD Now™ button. The receiver will display a list of all the recorded files (sorted by time of recording by default). The live broadcast is still on, until the listener presses the PLAY button.

The listener will select the desired file to play back using the Control Keys, and press the PLAY button or the ENTER button to commence playback. The PSD of the selected file is scrolled. The SKIP buttons (<< and >>) can be used to start playing the previous file or the next file in the list. The Rewind or Fast Forward buttons (< and >) can be used to fast-forward or rewind within the file being played back. The STOP button can stop playback.

The user can press the AM or FM buttons at any time to return to the live broadcast. A marker will be placed in the file that was being played so that if the user desires to return to listening to that file, playing will resume at the same point in the program where the playing was stopped. Similarly, at any time during playback the listener can choose a different file and press the PLAY button to begin playback of that file. A marker will be placed in the file that was initially being played, and the receiver will resume playback of that file at the point indicated by the marker.

Before playing a recorded file, the listener will be able to preview the contents of the selected file by scrolling through the PSD information or ID3 tags associated with the contents of that file. To preview a file, the user can press the HD Now™ button. The receiver will display a list of all the recorded files (sorted by time of recording by default). The live broadcast is still on, until the listener presses the PLAY button.

Next the user can select the desired file to playback using the Control Keys, and press the "skip next" or "skip previous" arrow Control Keys to scroll through the PSD content of the selected file. The read bar indicator will show the progress within the file. At the desired PSD location the listener will be able to play back the file based on the PSD location by pressing the PLAY button.

While navigating through a file using PSD message and the end of the file is reached, the listener will be returned to the HD Now™ screen displaying the list of recorded files. The user can press the HD Now™ button to go back to the list of recorded files.

To navigate within a file (fast-forward/rewind), the listener can use the Forward or Rewind buttons. This advances or reverses the file in 10-second intervals, which increases to 20 seconds and 30 seconds and multiples up to a maximum of 2 minutes the longer the FF button is pressed.

When the storage memory is full, the user can manually delete files to store more programs or content. To delete files, the user can press SETUP, select HD Now™ PREFERENCES, select FILE MANAGEMENT, select the desired file using the Control Keys, select DELETE for the selected file, and press ENTER to delete the selected file. The user is presented with a confirmation to delete.

Then the user can press the AM or FM button to return to a live broadcast or the HD Now™ button to return to playback. If the storage memory is full while recording, the listener is provided with an indication at least 95% before the memory is filled to delete files.

The user can use the Control Keys and the ENTER key to choose between MANAGE FILES or CANCEL RECORDING, press CANCEL RECORDING to stop recording and delete files at a later time, or press MANAGE FILES to manually delete files.

The recording will continue as the listener manually deletes files that are not needed. At this point, the user can press the AM or FM button to return to the station being recorded.

When the receiver storage memory is full while recording, the files can be deleted automatically without any user intervention by enabling the Auto-Erase feature. To set up Auto-Erase, the user can press SETUP, select HD Now™ PREFERENCES, select FILE MANAGEMENT, and set the Auto-Erase to ON. While recording, if the storage memory if full while recording, auto-erase enables the recording will continue by continuously over-writing the stored files beginning from the oldest file.

By using the Control Keys and the ENTER key the user can choose between CONTINUE RECORDING and CANCEL RECORDING. Then the user can press CANCEL RECORDING to stop recording and delete files at later time, or press CONTINUE RECORDING to continue recording by automatically deleting files from the storage memory.

Auto-Erase will automatically delete oldest recorded files and the current recording will continue until memory is full. If the current recording fills up the entire memory, the listener will then have to manually delete files not needed.

The listener will be able to play back any recorded file while simultaneously recording a live broadcast. While recording, the user can press the HD Now™ button. The list of recorded files will be displayed. Then the user can select the desired file to play back using the Control Keys, and press the PLAY button or the ENTER button to commence playback. The recording and playback of the live broadcast will continue.

The user can press the AM or FM buttons at any time to return to the respective live broadcast being recorded. To return to playback, the user can press the HD Now™ button once again and press the PLAY button. Playback of the selected file will begin where it was left off earlier.

The listener will be able record a live broadcast during a playback session without interrupting the playback. The RECORD and CHANNEL SELECT buttons can be used to set a recording while in the HD Now™ screen. The station name and the channel numbers appear above the respective CHANNEL SELECT buttons. The time durations can be set using the Control Keys as described previously and the CHANNEL SELECT buttons can be used to stop the recording.

To switch to a live broadcast and set recording, the user can press the AM or FM button. Playback will be paused and a marker inserted into the file so that playback can resume at the same point in the program. Then the display switches to the live broadcast. Next the user can press the RECORD button and the respective CHANNEL SELECT button to start recording. The recording durations can be set using the Control Keys. The user can press the HD Now™ button to return to the playback session. The last file played is automatically played back.

To stop the playback while switching to a live broadcast and set recording, the user can press the STOP Button, or alternatively, press the AM or FM button twice. The display switches the live broadcast. Next the user can press the RECORD button and the respective CHANNEL SELECT button to start recording. The recording durations can be set using the Control Keys. The user can press the HD Now™ button to return to playlist of recorded files to select a file to playback.

In some instances, the listener may experience a weak radio signal and may go in and out of coverage while recording a program. To address this condition, the user can set the Dropout Tolerance in the File Management settings in the SETUP menu. In one example, by default the number of dropouts allowed while recording is ‘4’. When the signal is lost while recording, the listener is given an indication that recording has stopped due to a lost signal. A ‘(1)’ in parenthesis indicates the first instance of the signal loss. The recording will continue when the HD Radio™ signal is reacquired. If the listener decided to tune to another station in poor signal conditions the recording will stop permanently. If the signal loss occurs more than ‘4’ times as entered in the SETUP, the listener is given an indication that recording will not continue.

When recording is automatically commenced on acquiring back a signal, the recording is stored on the receiver as a separate file. Using a separate file prevents storing long periods of silence in the same file and provides an indication to the listener that there has been an interruption in the recording of a particular program.

An optional feature is HD UPDATE™. Using this feature, the listener has the capability to record short durations (or segments) of selected Program Types. The receiver will automatically record the program based on the program type specified at the selected station frequency. Each recording of the program will overwrite the previous recorded content and the listener is presented with the most updated program content. The Program Types can include: NEWS, SPORTS, WEATHER, EMERGENCY, TRAFFIC, TALK, and INFORMATION. The listener can also use the Preset buttons for Program Types. The HD UPDATE™ feature can be enabled or disabled—ON or OFF.

The HD UPDATE™ Start Time can be selected through the Hour: 1-12, Minutes: 00, 15, 30, 45 and AM/PM fields using the drop-down list. The current time is displayed as the default. The Duration parameter allows the user to specify how long to record a program. The user has the option to select values of 2, 5, 10, 15 minutes. This allows the recording to stop after a specified amount of time, without requiring the user to press the Stop button.

The Occurrence parameter specifies the frequency of the particular scheduled recording. The options are Daily, or Weekly. The SAVE button is used to specify that the user wants to save the entered schedule. The NEXT button allows the user to create another program type-based recording event—HD UPDATE™. If Yes, then another scheduled recording screen is presented.

The recording of a program will be stopped when the listener tunes to a different frequency or station while recording. If the receiver is tuned to a different frequency while recording, the listener is provided with a ‘caution’ message that the recording will stop if tuned out. An option to continue the action or to cancel the action is provided. The user can press CANCEL to continue recording and stay tuned to the same station, or CONTINUE to cancel the recording and tune-out of the current station.

While the present invention has been described in terms of its preferred embodiment, it will be understood by those skilled in the art that various modifications can be made to the disclosed embodiment without departing from the scope of the invention as set forth in the claims.

What is claimed is:

1. A method for receiving and processing a digital radio broadcasting signal, the method comprising the steps of:
- receiving a digital radio broadcasting signal including content;
- storing encoded content;
- using a processor to decode the stored encoded content to recover decoded content;
- specifying a dropout tolerance parameter; and
- stopping the storing step when the number of dropouts exceeds the dropout tolerance parameter.

2. The method of claim 1, wherein the step of storing encoded content stores user selected content.

3. The method of claim 1, wherein the stored encoded content comprises protocol data units or packets.

4. The method of claim 3, wherein the packets are audio packets.

5. The method of claim 1, wherein the step of decoding the stored encoded content to recover the decoded content processes the stored encoded content according to a logical protocol stack.

6. The method of claim 1, wherein the received content comprises multicast content representing one or more programs.

7. The method of claim 6, wherein the multicast content represents a main program and one or more supplemental programs.

8. The method of claim 1, wherein the stored encoded content comprises multicast content representing one or more programs.

9. The method of claim 8, wherein the stored encoded content represents a main program and one or more supplemental programs.

10. The method of claim 1, wherein storing the encoded content stops when the quality of the digital radio broadcasting signal falls below a threshold quality criteria and resumes when the quality of the digital radio broadcasting signal exceeds the threshold quality criteria.

11. The method of claim 10, wherein upon resumption of storing the encoded content, the encoded content is stored in a new file.

12. The method of claim 1, further comprising the step of:
providing a visual indication of the quality of the received digital radio broadcasting signal.

13. The method of claim 1, further comprising the steps of:
monitoring content in the digital radio broadcasting signal; and
prompting a user to store encoded content from the digital radio broadcasting signal when a preselected type of content in the digital radio broadcasting signal is detected.

14. The method of claim 1, further comprising the steps of:
monitoring content in the digital radio broadcasting signal; and
automatically storing encoded content from the digital radio broadcasting signal when a preselected type of content in the digital radio broadcasting signal is detected.

15. The method of claim 1, further comprising the step of:
storing program service data and/or data tags related to the decoded content.

16. The method of claim 15, wherein the data tags are ID3 tags.

17. The method of claim 1, further comprising the steps of:
receiving a second digital radio broadcasting signal including second content; and
storing second encoded content.

18. The method of claim 1, further comprising the step of:
automatically deleting previously stored encoded content from a memory when the memory is full.

19. The method of claim 18, wherein the previously stored encoded content is selected for deletion based on a number of times that the previously stored encoded content was played back.

20. A method for receiving and processing a digital radio broadcasting signal, the method comprising the steps of:
receiving a digital radio broadcasting signal including content;
storing encoded content;
using a processor to decode the stored encoded content to recover decoded content; and
blending the decoded content to mute when the stored encoded content is defective due to the quality of the digital radio broadcasting signal falling below the threshold quality criteria.

21. A receiver for receiving and processing a digital radio broadcasting signal, the receiver comprising:
an input for receiving a digital radio broadcasting signal including content;
a memory for storing encoded content; and
a processor for decoding the stored encoded content to recover decoded content, wherein the prOcessor blends the decoded content to mute when the stored encoded content is defective due to the quality of the digital radio broadcasting signal falling below a threshold quality criteria.

22. The receiver of claim 21, wherein the stored encoded content comprises protocol data units or packets.

23. The receiver of claim 22, wherein the packets are audio packets.

24. The receiver of claim 21, wherein the processor processes the stored encoded content according to a logical protocol stack.

25. The receiver of claim 21, wherein the received content comprises multicast content representing one or more programs.

26. The receiver of claim 25, wherein the multicast content represents a main program and one or more supplemental programs.

27. The receiver of claim 21, wherein the stored encoded content comprises multicast content representing one or more programs.

28. The receiver of claim 27, wherein the stored encoded content represents a main program and one or more supplemental programs.

29. The receiver of claim 21, further comprising:
an indicator for indicating the quality of the received digital radio broadcasting signal.

30. The receiver of claim 21, wherein the processor monitors content in the digital radio broadcasting signal, and prompts a user to store encoded content from the digital radio broadcasting signal when a preselected type of content in the digital radio broadcasting signal is detected.

31. The receiver of claim 21, wherein the processor monitors content in the digital radio broadcasting signal, and automatically causes the memory to store encoded content from the digital radio broadcasting signal when a preselected type of content in the digital radio broadcasting signal is detected.

32. The receiver of claim 21, wherein the memory stores program service data and/or data tags related to the decoded content.

33. The receiver of claim 32, wherein the data tags are ID3 tags.

34. The receiver of claim 21, wherein the input receives a second digital radio broadcasting signal including second content, and the memory stores second encoded content.

35. The receiver of claim 21, further comprising:
a docking station for transferring the stored encoded content to a player.

36. A method comprising:
receiving an in-band on-channel digital radio broadcasting signal including encoded content;
extracting a baseband signal from the in-band on-channel digital radio broadcasting signal;
using a processor to process the baseband signal according to a logical protocol stack to produce encoded encapsulated packets including encoded audio content and program specific data;
storing the encoded encapsulated packets;
separating the encoded audio content and the program specific data;
decoding the encoded audio content to recover decoded content; and
using the decoded content to produce an output.

37. The method of claim 36, wherein the encoded content comprises multicast content representing one or more programs.

38. The method of claim 36, wherein storing the encoded encapsulated packets content stops when the quality of the in-band on-channel digital radio broadcasting signal falls below a threshold quality criteria and resumes when the quality of the in-band on-channel digital radio broadcasting signal exceeds the threshold quality criteria.

39. The method of claim 38, wherein upon resumption of storing the encoded encapsulated packets, the encoded encapsulated packets are stored in a new file.

40. The method of claim 36, further comprising the step of: blending the decoded content to mute when the stored encoded encapsulated packets are defective due to the quality of the in-band on-channel digital radio broadcasting signal falling below the threshold quality criteria.

41. The method of claim 36, further comprising the steps of:

specifying a dropout tolerance parameter; and stopping the storing step when the number of dropouts exceeds the dropout tolerance parameter.

42. The method of claim 36, further comprising the step of: providing a visual indication of the quality of the received in-band on-channel digital radio broadcasting signal.

43. The method of claim 36, further comprising the steps of:

monitoring the encoded content in the in-band on-channel digital radio broadcasting signal; and prompting a user to store the encoded encapsulated packets when a preselected type of content in the in-band on-channel digital radio broadcasting signal is detected.

44. The method of claim 36, further comprising the steps of:

monitoring the encoded content in the in-band on-channel digital radio broadcasting signal; and automatically storing the encoded encapsulated packets when a preselected type of content in the digital radio broadcasting signal is detected.

45. The method of claim 36, wherein the stored encoded encapsulated packets are selected for deletion based on a number of times that the stored encoded encapsulated packets were played back.

46. A receiver comprising:

an input for receiving an in-band on-channel digital radio broadcasting signal including encoded content;

a circuit for extracting a baseband signal from the in-band on-channel digital radio broadcasting signal;

a processor for processing the baseband signal according to a logical protocol stack to produce encoded encapsulated packets including encoded audio content and program specific data;

a memory for storing the encoded encapsulated packets, wherein the processor retrieves the encoded encapsulated packets from the memory and separates the encoded audio content and the program specific data and decodes the encoded audio content to recover decoded content; and an output circuit producing an output from the decoded content.

47. The receiver of claim 46, wherein the received encoded content comprises multicast content representing one or more programs.

48. The receiver of claim 46, wherein the processor blends the decoded content to mute when the stored encoded encapsulated packets are defective due to the quality of the in-band on-channel digital radio broadcasting signal falling below a threshold quality criteria.

49. The receiver of claim 46, further comprising:

an indicator for indicating the quality of the in-band on-channel digital radio broadcasting signal.

50. The receiver of claim 46, wherein the processor monitors the encoded content in the in-band on-channel digital radio broadcasting signal, and prompts a user to store the encoded encapsulated packets when a preselected type of content in the digital radio broadcasting signal is detected.

51. The receiver of claim 46, wherein the processor monitors content in the in-band on-channel digital radio broadcasting signal, and automatically causes the memory to store the encoded encapsulated packets when a preselected type of content in the in-band on-channel digital radio broadcasting signal is detected.

52. A system comprising:

a receiver including an input for receiving an in-band on-channel digital radio broadcasting signal including encoded content, a circuit for extracting a baseband signal from the in-band on-channel digital radio broadcasting signal, a processor for processing the baseband signal according to a logical protocol stack to produce encoded encapsulated packets including encoded audio content and program specific data, and a first memory for storing the encoded encapsulated packets; and a player including a second memory for storing encoded encapsulated packets and a processor for decoding the stored encoded content to recover decoded content.

53. The system of claim 52, further comprising:

a docking station for transferring the stored encoded encapsulated packets from the receiver to the player.

* * * * *